(12) United States Patent
Fattah

(10) Patent No.: US 8,996,920 B2
(45) Date of Patent: Mar. 31, 2015

(54) FINITE STATE MACHINE METHOD FOR TEST CASE GENERATION AND EXECUTION OF COMMUNICATION PROTOCOLS

(71) Applicant: Spirent Communications, Sunnyvale, CA (US)

(72) Inventor: Hossam Fattah, Eatontown, NJ (US)

(73) Assignee: Spirent Communications, Inc., Sunnyvale, CA (US)

( * ) Notice: Subject to any disclaimer, the term of this patent is extended or adjusted under 35 U.S.C. 154(b) by 231 days.

(21) Appl. No.: 13/656,397

(22) Filed: Oct. 19, 2012

(65) Prior Publication Data

US 2014/0115394 A1   Apr. 24, 2014

(51) Int. Cl.
*G06F 11/00* (2006.01)
*G06F 11/26* (2006.01)

(52) U.S. Cl.
CPC ..................... *G06F 11/26* (2013.01)
USPC ........................................................ 714/38.1

(58) Field of Classification Search
CPC ............ G06F 11/3688; G06F 11/3676; G06F 11/3684; G06F 11/3664; G06F 11/3636; G06F 11/3672
USPC .................................................... 714/38.1, 32
See application file for complete search history.

(56) References Cited

U.S. PATENT DOCUMENTS 5,995,753 A  * 11/1999 Walker .......................... 717/108
7,647,219 B2 *  1/2010 Overturf et al. ................. 703/16

* cited by examiner

*Primary Examiner* — Yair Leibovich
(74) *Attorney, Agent, or Firm* — Haynes Beffel & Wolfeld LLP; Ernest J. Beffel, Jr.; Yiding Wu

(57) ABSTRACT

The technology disclosed relates to implementing a novel architecture of a finite state machine (abbreviated FSM) that can be used for testing. In particular, it can be used for testing communications devices and communication protocol behaviors.

25 Claims, 25 Drawing Sheets

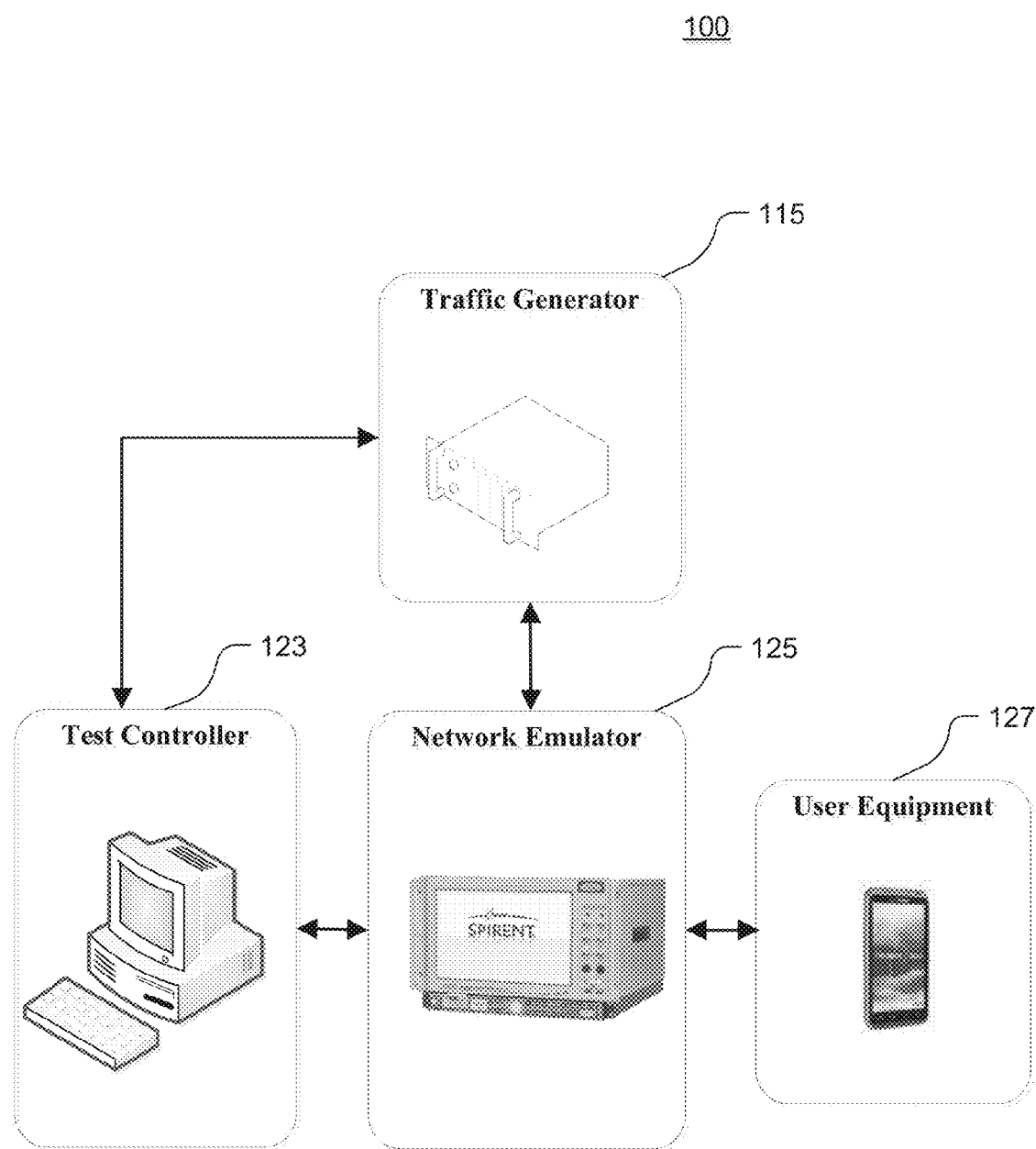
Fig. 1 - High-Level Architecture

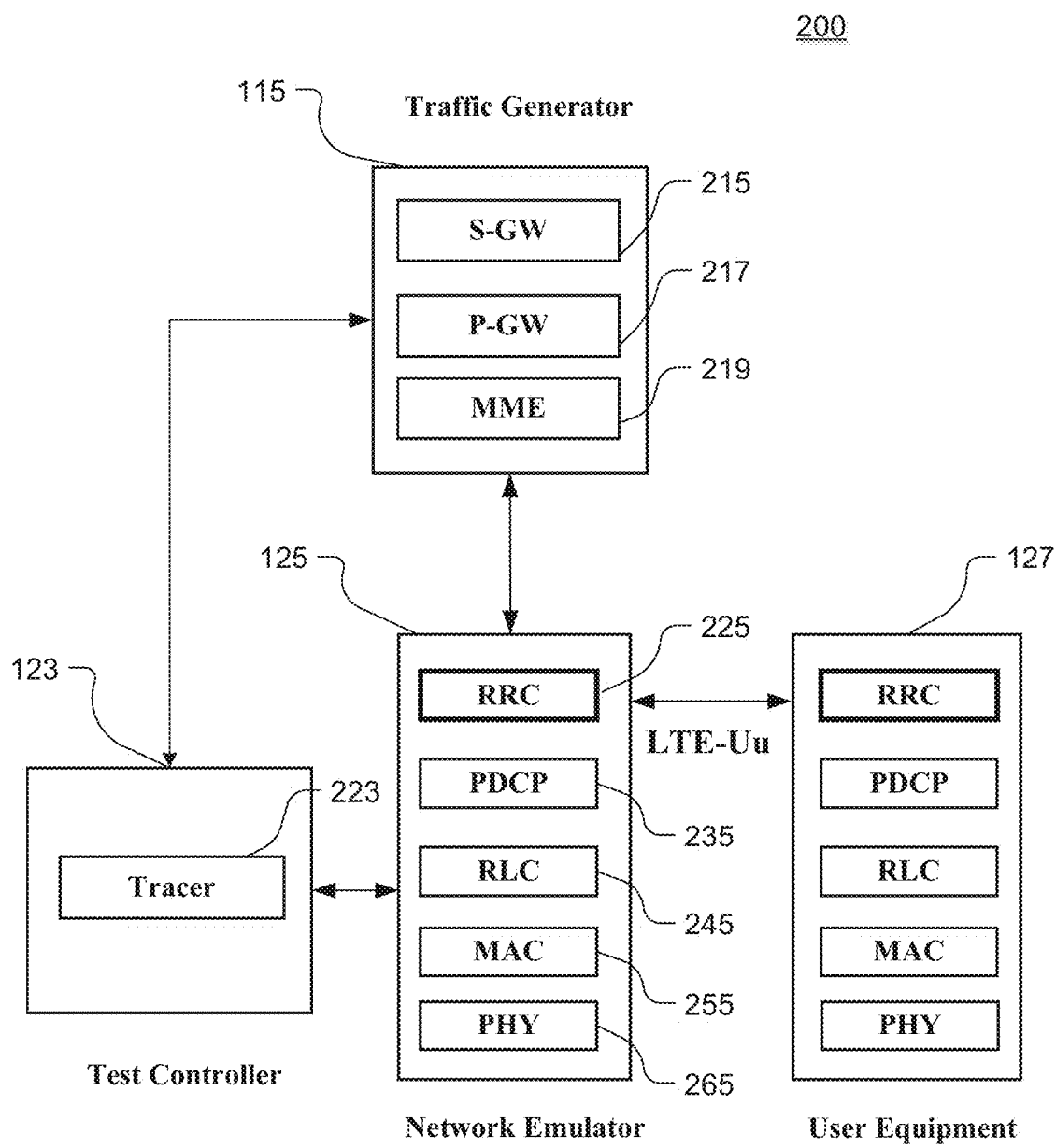
Fig. 2 - Threading Architecture

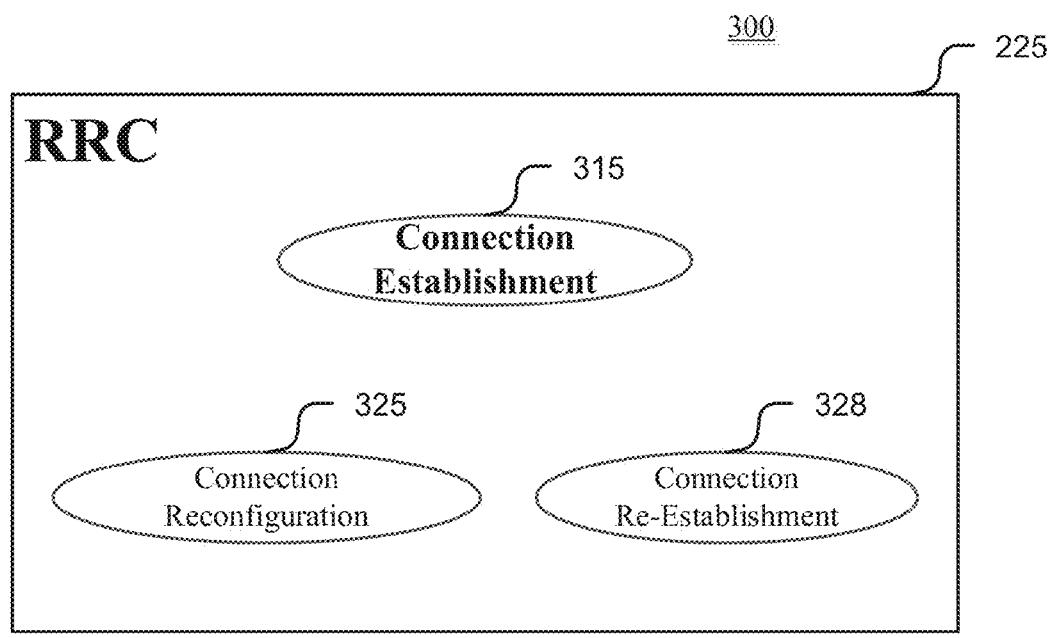
Fig. 3 - Threading Architecture of LTE-Uu Interface

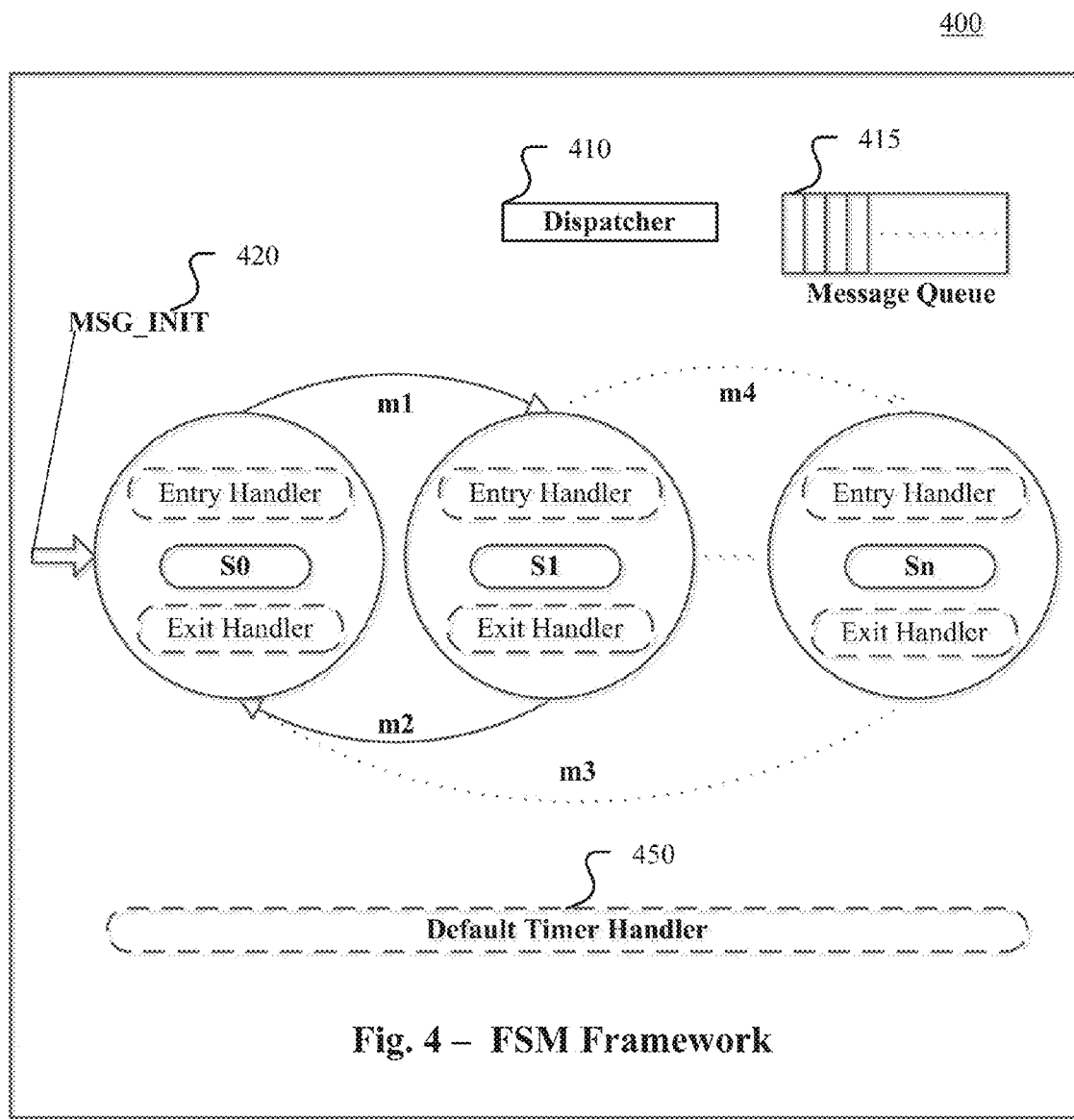
Fig. 4 – FSM Framework

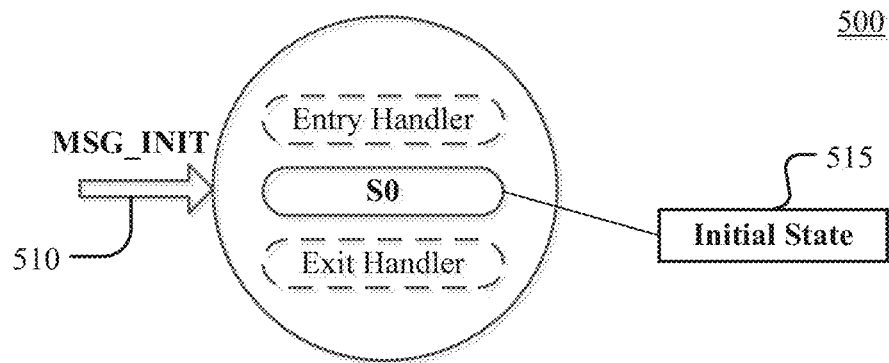
Fig. 5 – State-Message Duple
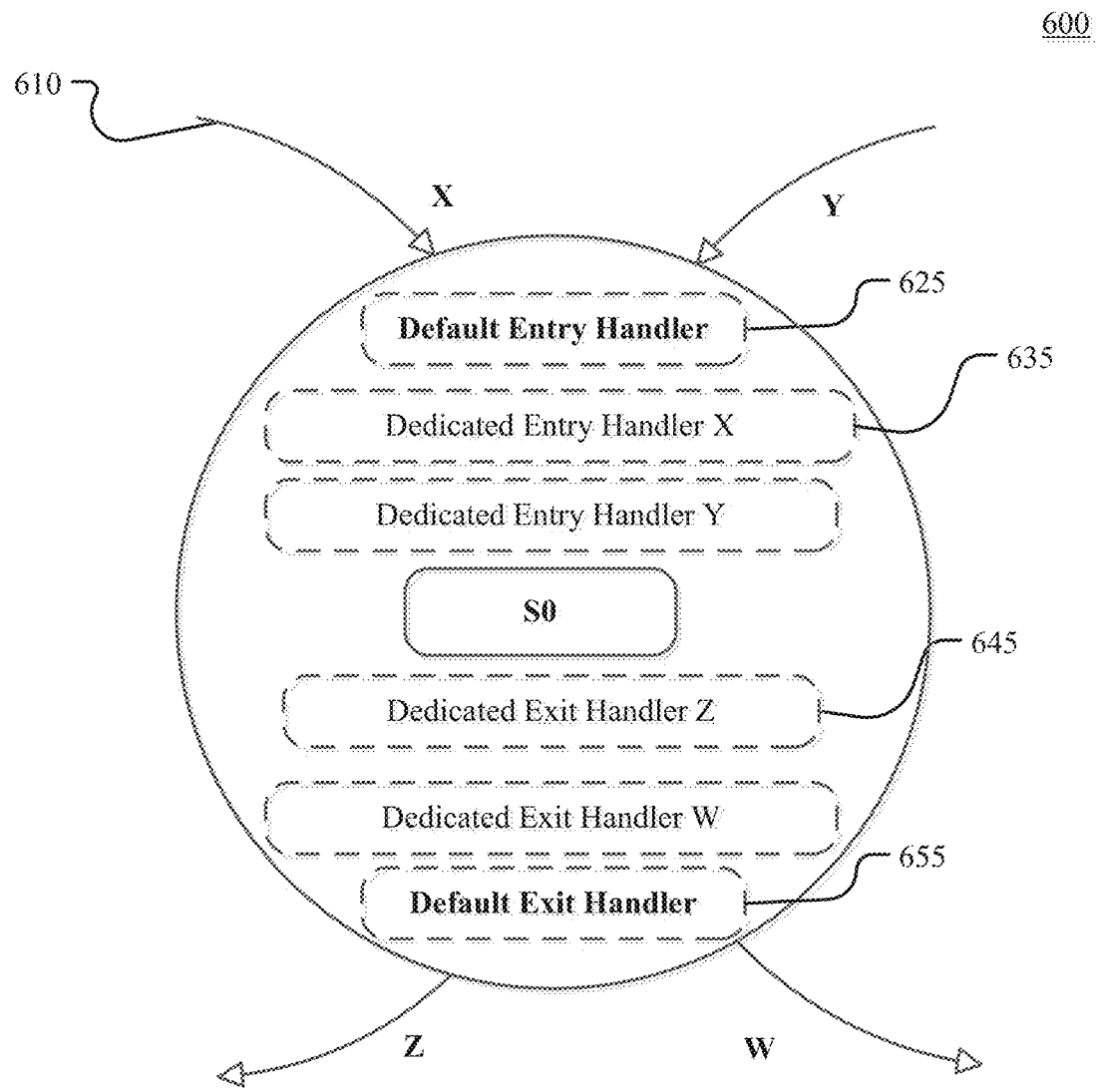
Fig. 6 – State Handlers

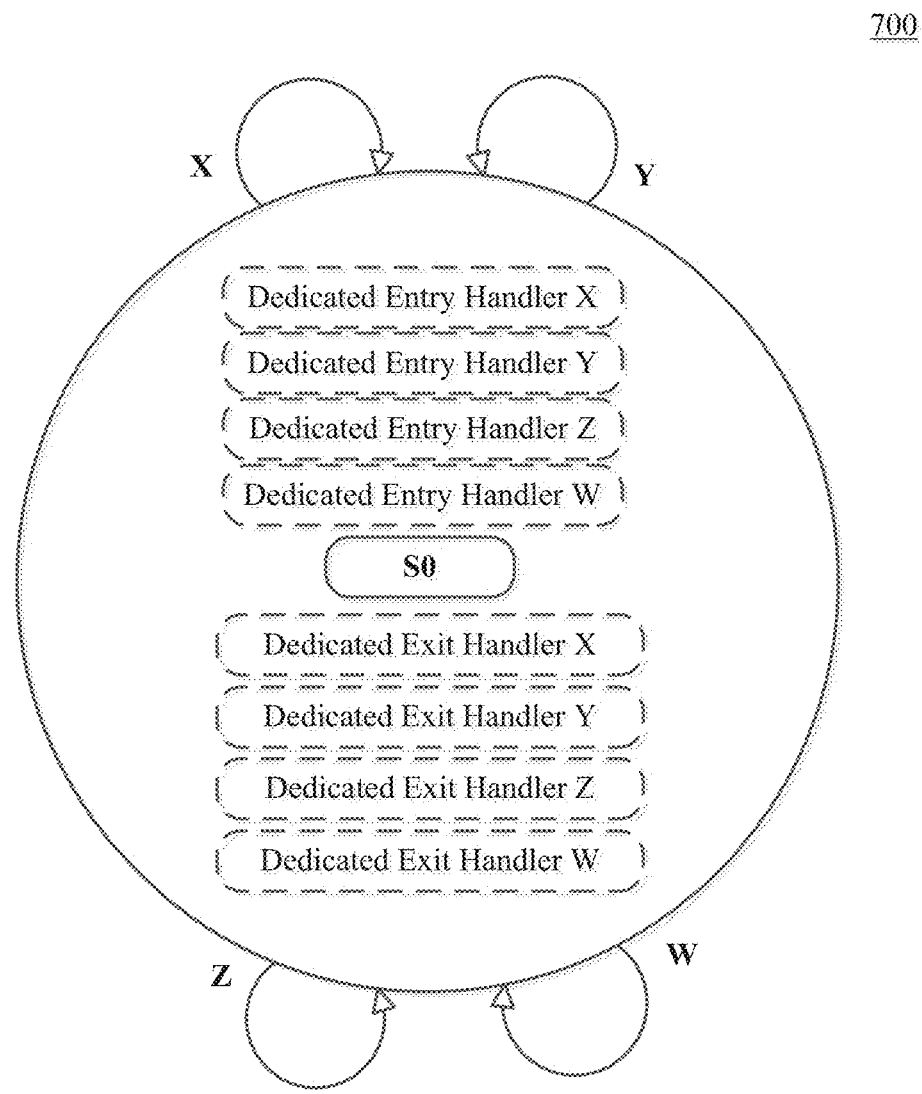
Fig. 7 — Self-Transition

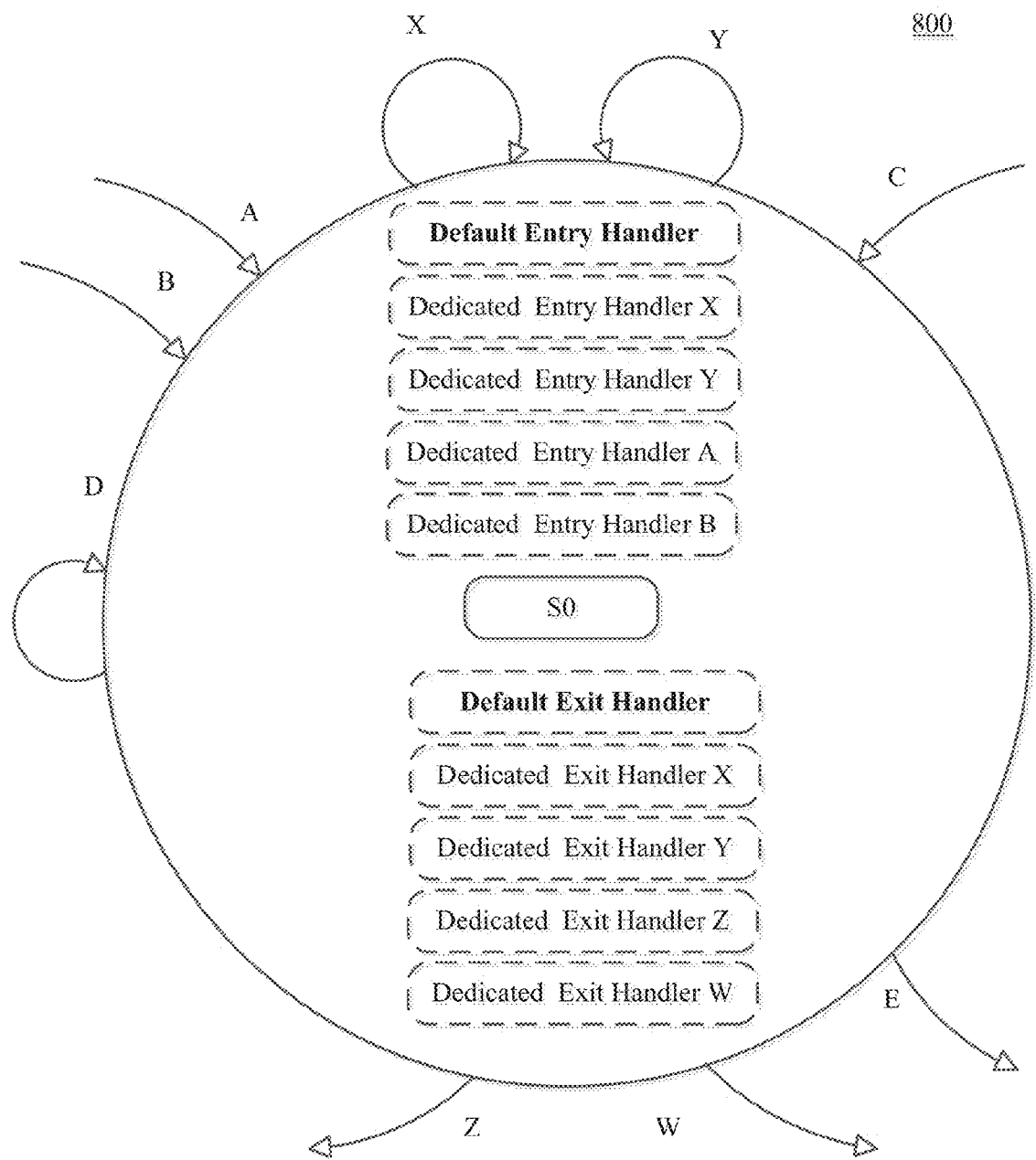
Fig. 8 – Various Implementations of State Handlers

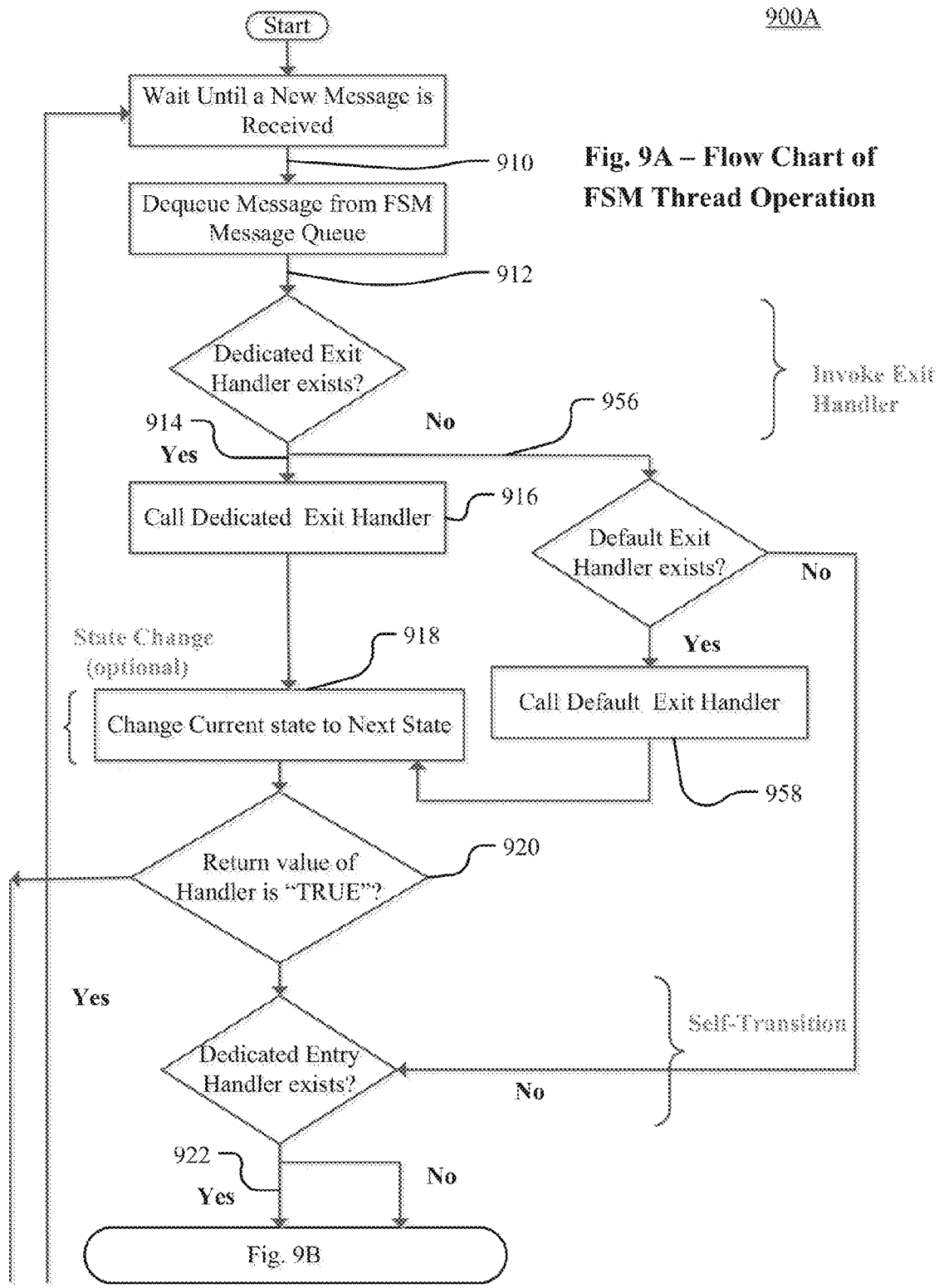
Fig. 9A – Flow Chart of FSM Thread Operation

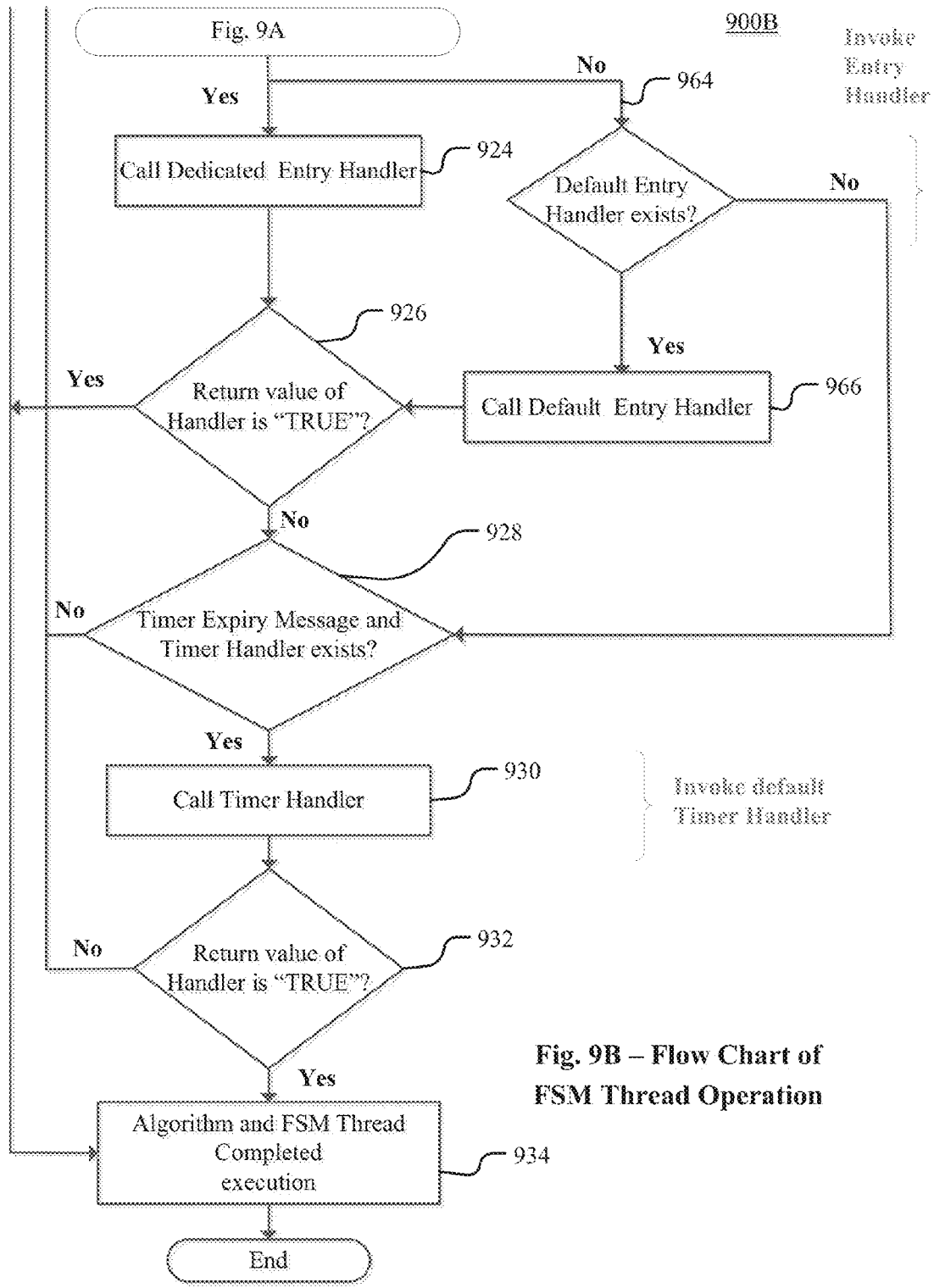
Fig. 9B – Flow Chart of FSM Thread Operation

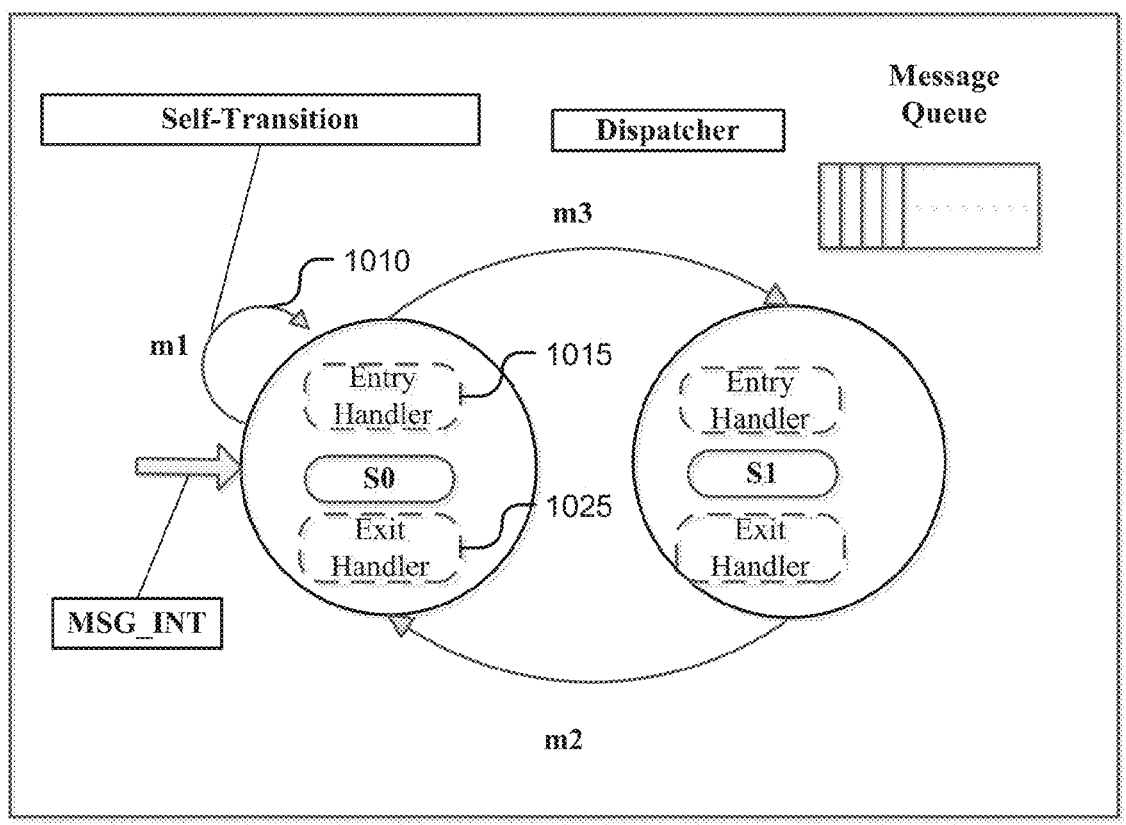
Fig. 10 – FSM with Self-Transition

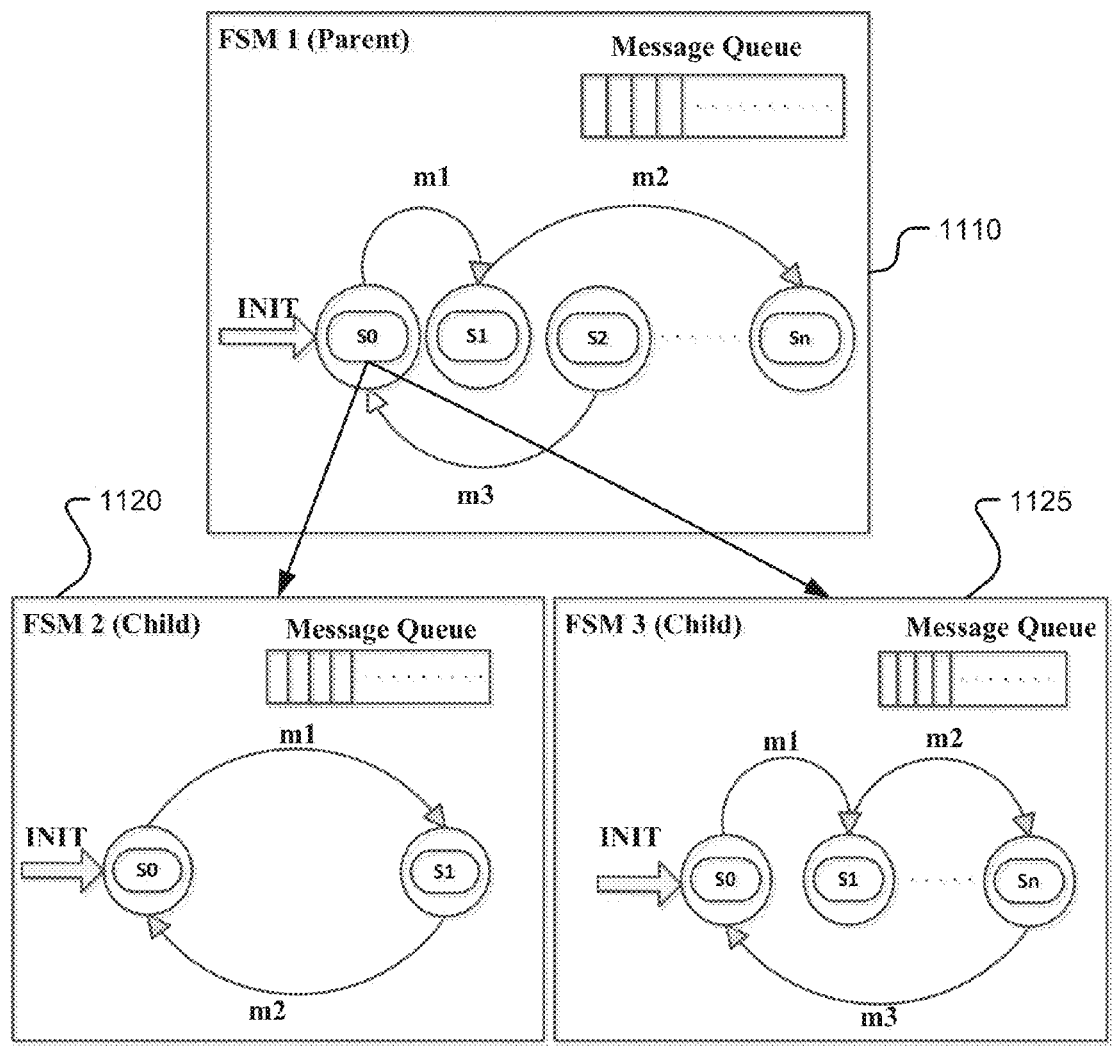
Fig. 11 – Parent with Two Child FSMs

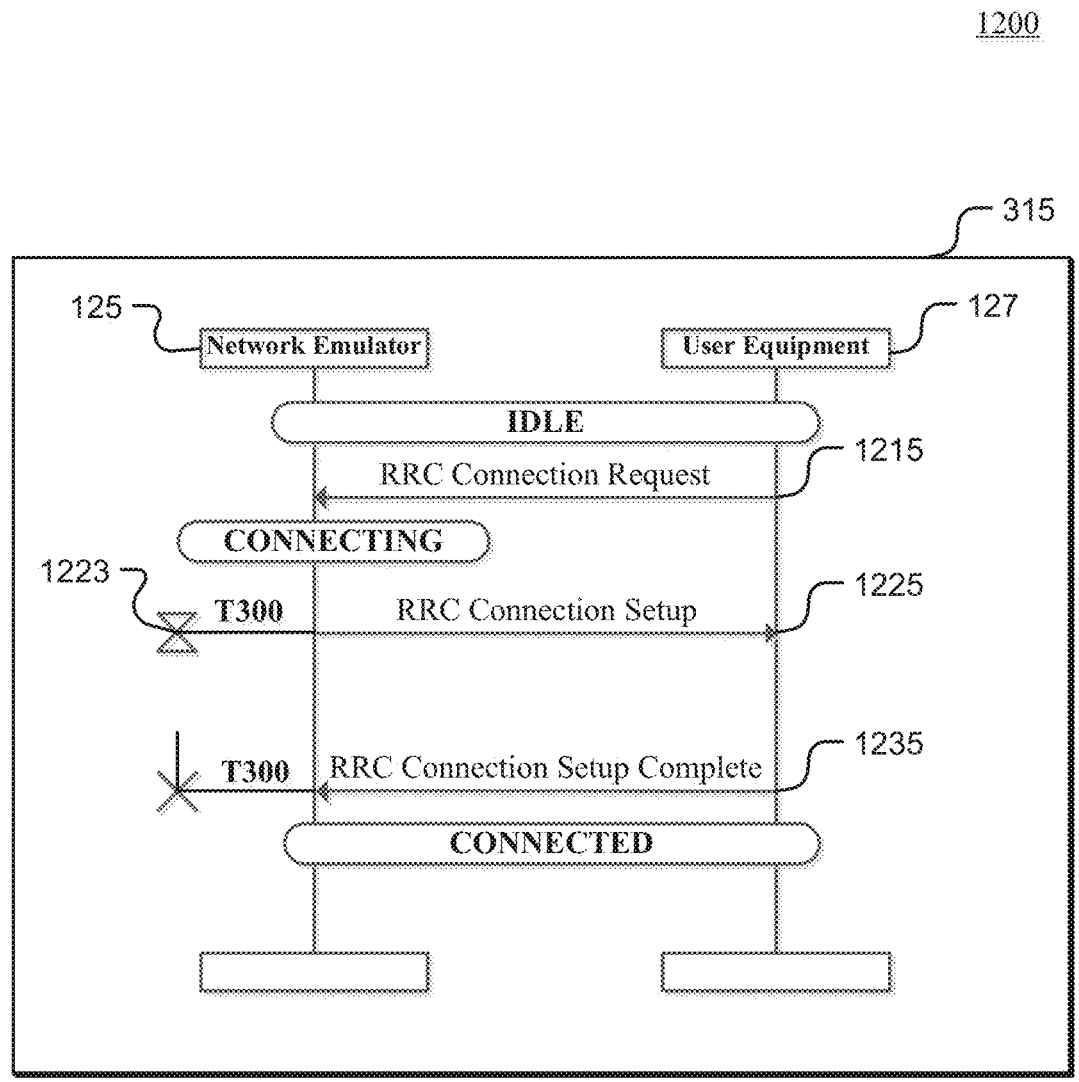
Fig. 12 - Message Sequence Chart for Connection Establishment in RRC Protocol

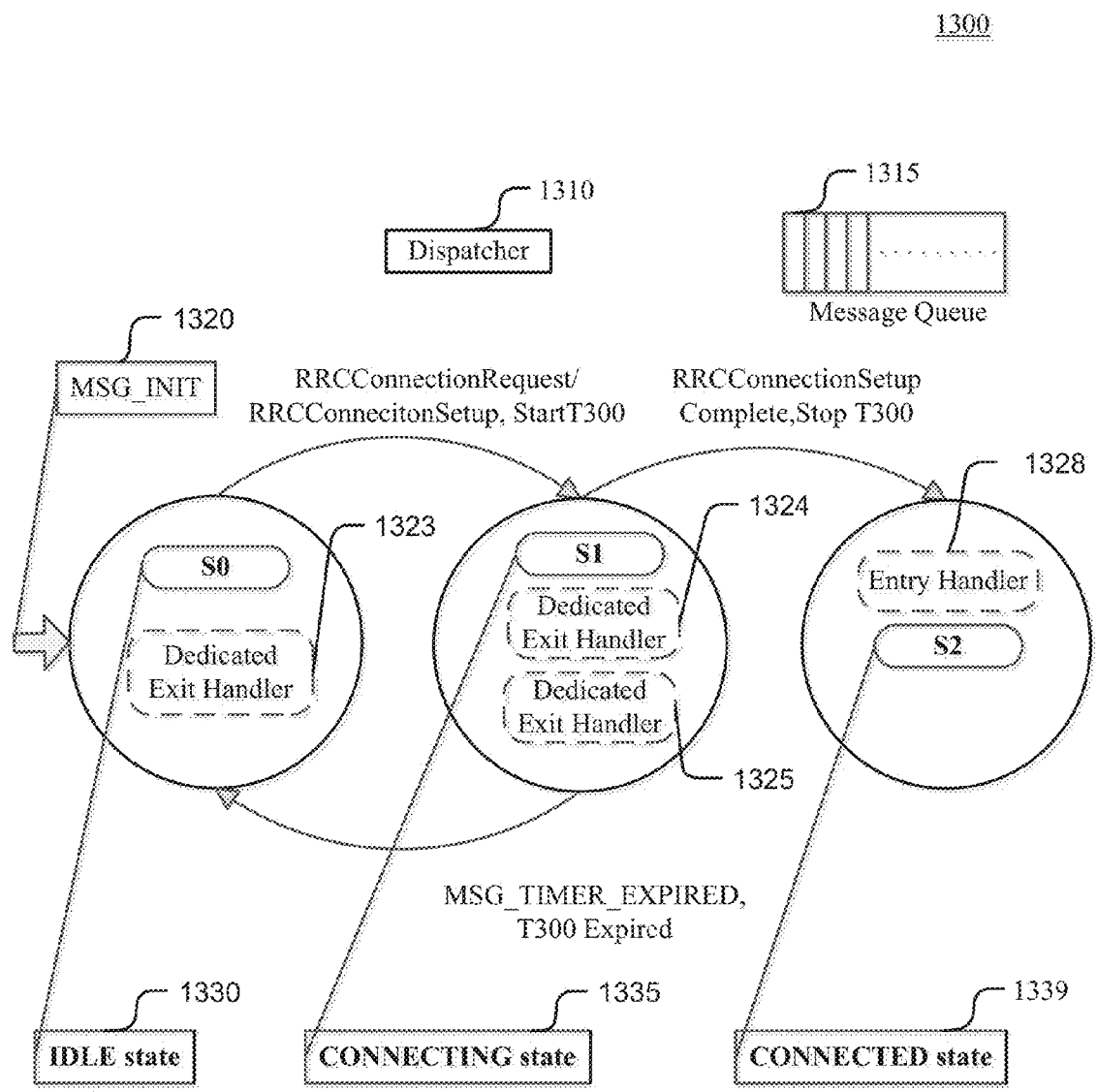
Fig. 13 - Multi-State FSM Describing
Connection Establishment Test Case

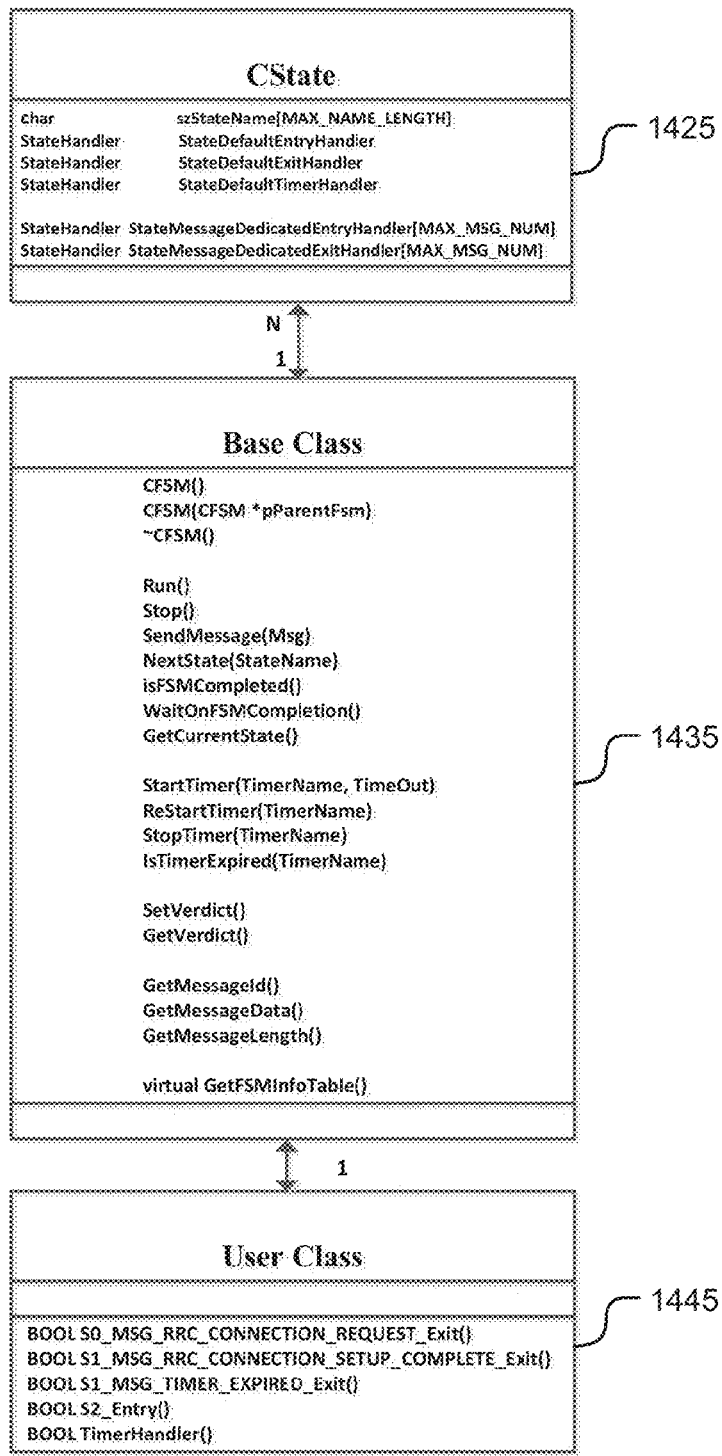
Fig. 14 - Class Diagram of an FSM Frame Work

1500

```
//Define the FSM Class
#define FSM(FSMClass)                                           \
      class FSMClass: public CFSM //Declare a pair of default Exit and Entry Handlers for a State
define DECLARE_STATE_HANDLER(State)                            \
      bool State##_Entry(void);                                 \
      bool State##_Exit(void);

//Declare a default Exit Handler for a State
#define DECLARE_STATE_EXIT_HANDLER(State)                       \
      bool State##_Exit(void);

//Declare a default Entry Handler for a State
#define DECLARE_STATE_ENTRY_HANDLER(State)                      \
      bool State##_Entry(void);

//Declare a pair of dedicated Exit and Entry Handlers for a specific
//message for a State
#define DECLARE_STATE_MESSAGE_HANDLER(State, MsgID)             \
      bool State##_##MsgID##_Entry(void);                       \
      bool State##_##MsgID##_Exit(void);

//Declare a dedicated Exit Handler for a specific message for a State
#define DECLARE_STATE_MESSAGE_EXIT_HANDLER(State, MsgID)        \
      bool State##_##MsgID##_Exit(void);

//Declare a dedicated Entry Handler for a specific message for a State
#define DECLARE_STATE_MESSAGE_ENTRY_HANDLER(State, MsgID)       \
      bool State##_##MsgID##_Entry(void);

//Declare a default Timer Handler for the FSM
#define DECLARE_DEFAULT_TIMER_HANDLER()                         \
      bool TimerHandler(void);
```

Fig. 15 – Declaration of the Handlers in a User Class

```
//The Function header of a default Entry Handler for a State
#define ON_STATE_ENTRY(FSMClass, State)                    \
        bool FSMClass::State##_Entry(void)

//The Function header of a default Exit Handler for a State
#define ON_STATE_EXIT(FSMClass, State)                     \
        bool FSMClass::State##_Exit(void)

//The Function header of a dedicated Entry Handler for a message for a
//State
#define ON_STATE_MESSAGE_ENTRY(FSMClass, State, MsgID) \
        bool FSMClass::State##_##MsgID##_Entry(void)

//The Function header of a dedicated Exit Handler for a message for a
//State
#define ON_STATE_MESSAGE_EXIT(FSMClass, State, MsgID)  \
        bool FSMClass::State##_##MsgID##_Exit(void)

//The Function header of the default Timer Handler
#define ON_TIMER(FSMClass)                                 \
        bool FSMClass::TimerHandler(void)
```

Fig. 16 – Implementation of the Handlers in a User Class

1700

```
#define BEGIN_REGISTER(FSMClass)                                                        \
        CFSM::FSM_INFO_ENTRY *FSMClass::GetFSMInfoTable()                               \
        {                                                                               \
                typedef FSMClass ThisClass;                                             \
                static FSM_INFO_ENTRY FsmInfoTable[] =                                  \
                {                                                                       \
                //First Entry in this table is the FSM Name                             \
                {FSM_NAME, #FSMClass, 0, 0, 0, MSG_NONE},                                \ define REGISTER_STATE_HANDLER(State)                                                   \
        {STATE_HANDLER, #State, &ThisClass::State##_Entry, &ThisClass::State##_Exit, 0, MSG_NONE}, define REGISTER_STATE_ENTRY_HANDLER(State)                                             \
        {STATE_ENTRY_HANDLER, #State, &ThisClass::State##_Entry, 0, 0, MSG_NONE}, define REGISTER_STATE_EXIT_HANDLER(State)                                              \
        {STATE_EXIT_HANDLER, #State, 0, &ThisClass::State##_Exit, 0, MSG_NONE}, define REGISTER_STATE_MESSAGE_HANDLER(State, Msgid)                                    \
        {STATE_MESSAGE_HANDLER, #State, &ThisClass::State##_##Msgid##_Entry,
        &ThisClass::State##_##Msgid##_Exit, 0, Msgid}, define REGISTER_STATE_MESSAGE_ENTRY_HANDLER(State, Msgid)                              \
        {STATE_MESSAGE_ENTRY_HANDLER, _T(#State), &ThisClass::State##_##Msgid##_Entry, 0, 0, Msgid}, define REGISTER_STATE_MESSAGE_EXIT_HANDLER(State, Msgid)                               \
        {STATE_MESSAGE_EXIT_HANDLER, _T(#State), 0, &ThisClass::State##_##Msgid##_Exit, 0, Msgid}, define REGISTER_DEFAULT_TIMER_HANDLER()                                                \
        {DEFAULT_TIMER_HANDLER, 0, 0, 0, &ThisClass::TimerHandler, MSG_NONE}, define REGISTER_MESSAGE(Msgid)                                                         \
        {MESSAGE_ALPHABET, 0, 0, 0, 0, Msgid}, define END_REGISTER()                                                                  \
                {NONE_TYPE, 0, 0, 0, 0, MSG_NONE}        \
                };                                       \
                return &FsmInfoTable[0];                 \
        }
```

Fig. 17 – Implementation of the Overridden Method, GetFSMInfoTable(.), in an FSM User Class

```
1800

FSM(CConnectionEst)
{
public:
        CConnectionEst(void);
        ~CConnectionEst(void);

private:

DECLARE_STATE_MESSAGE_EXIT_HANDLER(S0, MSG_RRC_CONNECTION_REQUEST);
        DECLARE_STATE_MESSAGE_EXIT_HANDLER(S1, MSG_RRC_CONNECTION_SETUP_COMPLETE);
        DECLARE_STATE_MESSAGE_EXIT_HANDLER(S1, MSG_TIMER_EXPIRED);
        DECLARE_STATE_ENTRY_HANDLER(S2);

DECLARE_REGISTER()
};
```

Fig. 18 - C++ Header File for the User Class of Connection Establishment Procedure Test Case

```
BEGIN_REGISTER(CConnectionEst)

REGISTER_STATE_MESSAGE_EXIT_HANDLER(S0, MSG_RRC_CONNECTION_REQUEST)
    REGISTER_STATE_MESSAGE_EXIT_HANDLER(S1, MSG_RRC_CONNECTION_SETUP_COMPLETE)
    REGISTER_STATE_MESSAGE_EXIT_HANDLER(S1, MSG_TIMER_EXPIRED)
    REGISTER_STATE_ENTRY_HANDLER(S2)

END_REGISTER()

CConnectionEst::CConnectionEst(void)
{
}

CConnectionEst::~CConnectionEst(void)
{
}

ON_STATE_MESSAGE_EXIT(CConnectionEst, S0, MSG_RRC_CONNECTION_REQUEST)
{
    Send(MSG_RRC_CONNECTION_SETUP, "RrcConnectionSetup");

//Change State to State S1
    NextState(S1);
    //Start a Timer T300
    StartTimer(T300, 10*300);
    //FSM has not completed yet
    return false;
}

ON_STATE_MESSAGE_EXIT(CConnectionEst, S1, MSG_RRC_CONNECTION_SETUP_COMPLETE)
{
    //Change State to State S2
    NextState(S2);
    //FSM has not completed yet
    return false;
}

ON_STATE_MESSAGE_EXIT(CConnectionEst, S1, MSG_TIMER_EXPIRED)
{
    //Change State to State S0
    NextState(S0);
    //Test case failed
    SetVerdict(VERDICT_FAIL);
    StopTimer(T300);
    //FSM has completed
    return true;
}

ON_STATE_ENTRY(CConnectionEst, S2)
{
    //Test case passes successfully
    SetVerdict(VERDICT_PASS);
    StopTimer(T300);
    //FSM has completed
    return true;
}
```

Fig. 19 - C++ Source File for the User Class of the Connection Establishment Procedure Test Case

```
// Execution of Connection Establishment Test Case
#include "ConnectionEst.h"

int _main(int argc, char* argv[])
{
        CConnectionEst *pCConnectionEst = new CConnectionEst();
        pCConnectionEst->Run();
        pCConnectionEst->WaitOnFSMCompletion();

if (pCConnectionEst->GetVerdict() == VERDICT_PASS)
                printf("\nTest case passed successfully....");
        else
                printf("\nTest case failed....");

delete pCConnectionEst;

return 0;
}
```

Fig. 20 - C++ Code for Connection Establishment Procedure Test Case Execution

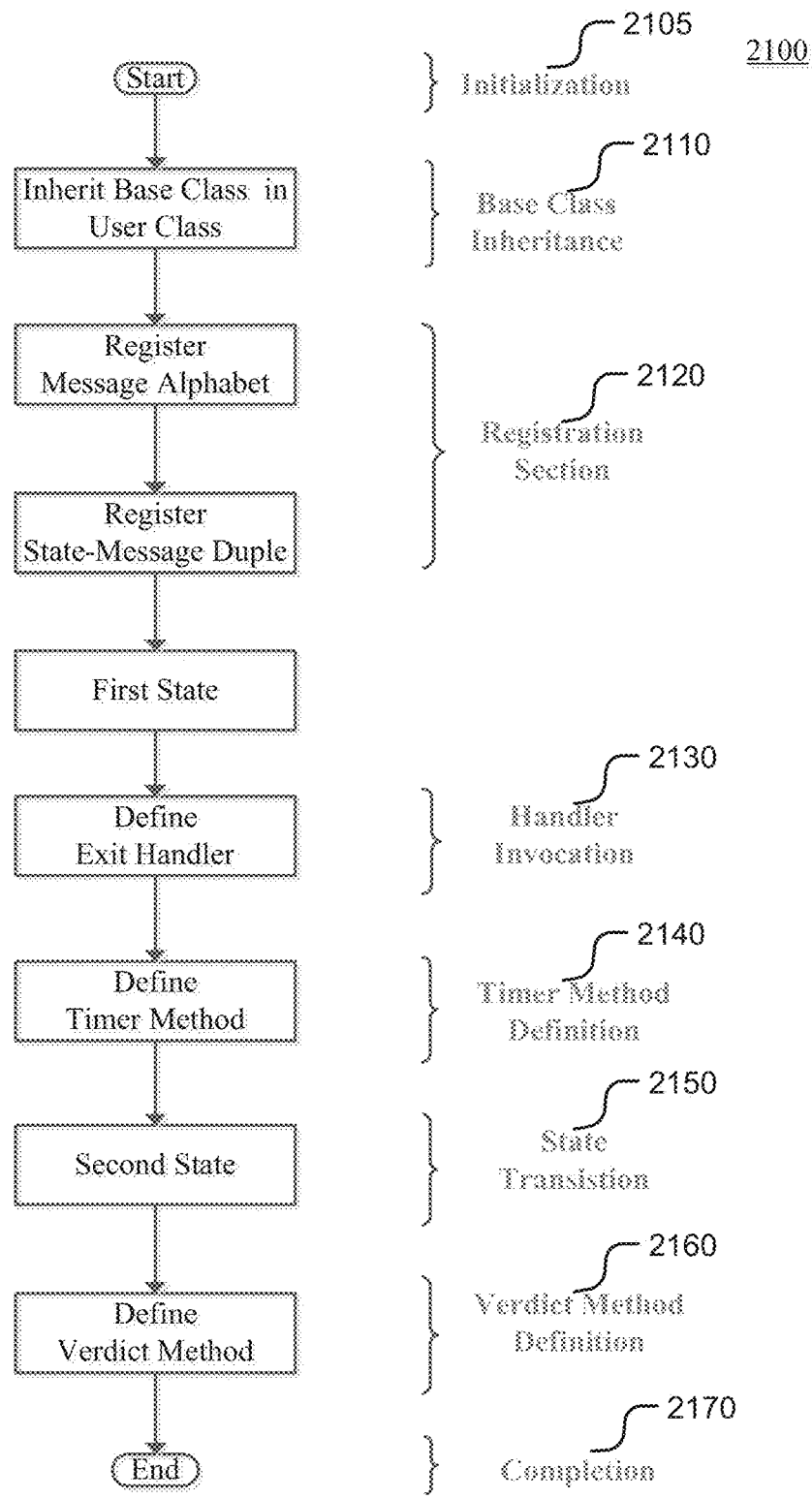
Fig. 21 - Method Flowchart

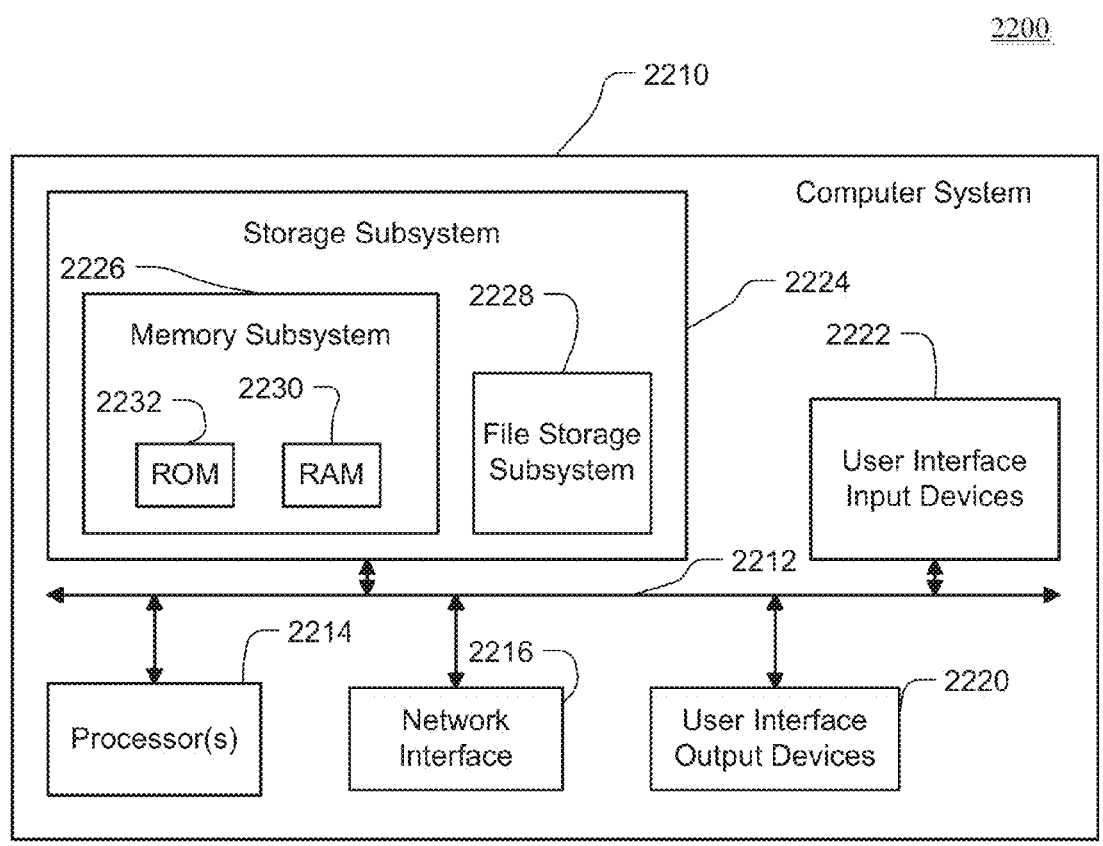
Fig. 22 – Computer System

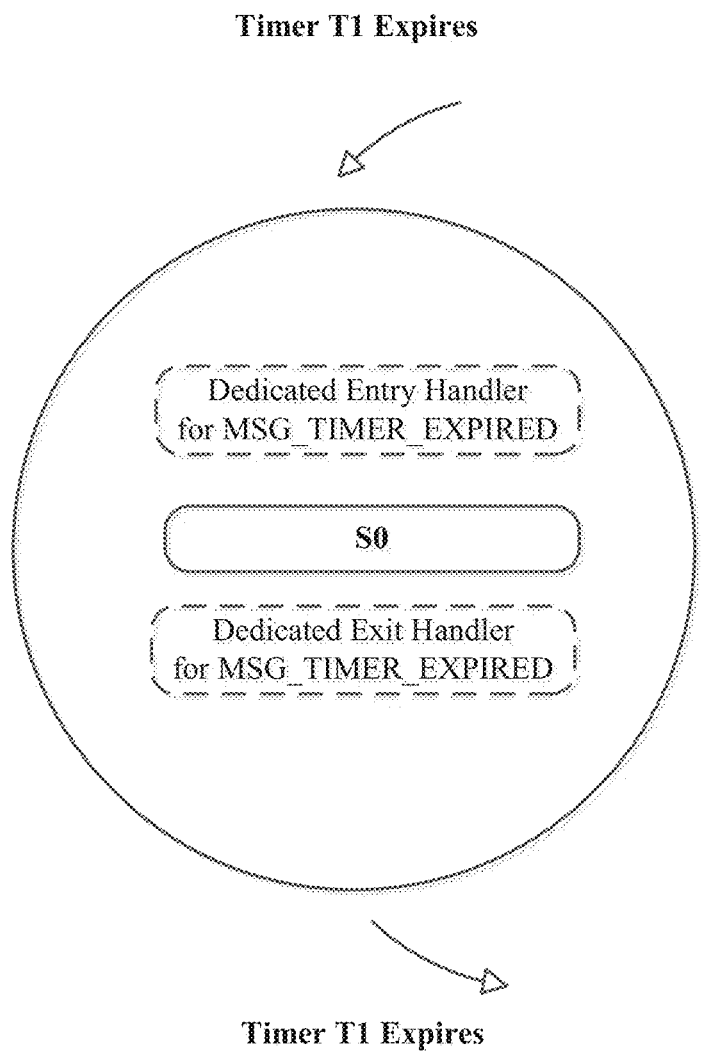
Fig. 23 – State Representation with Dedicated Handler for MSG_TIMER_EXPIRED message

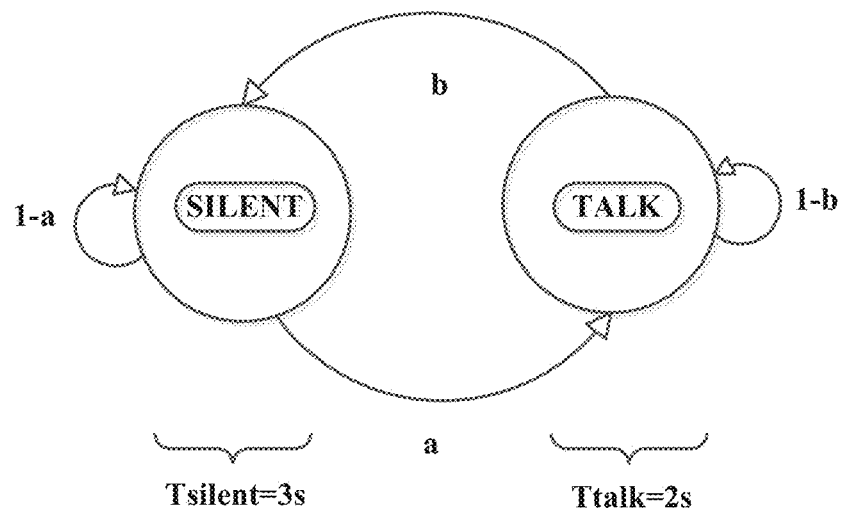
Fig. 24A – FSM for Voice Activity Model
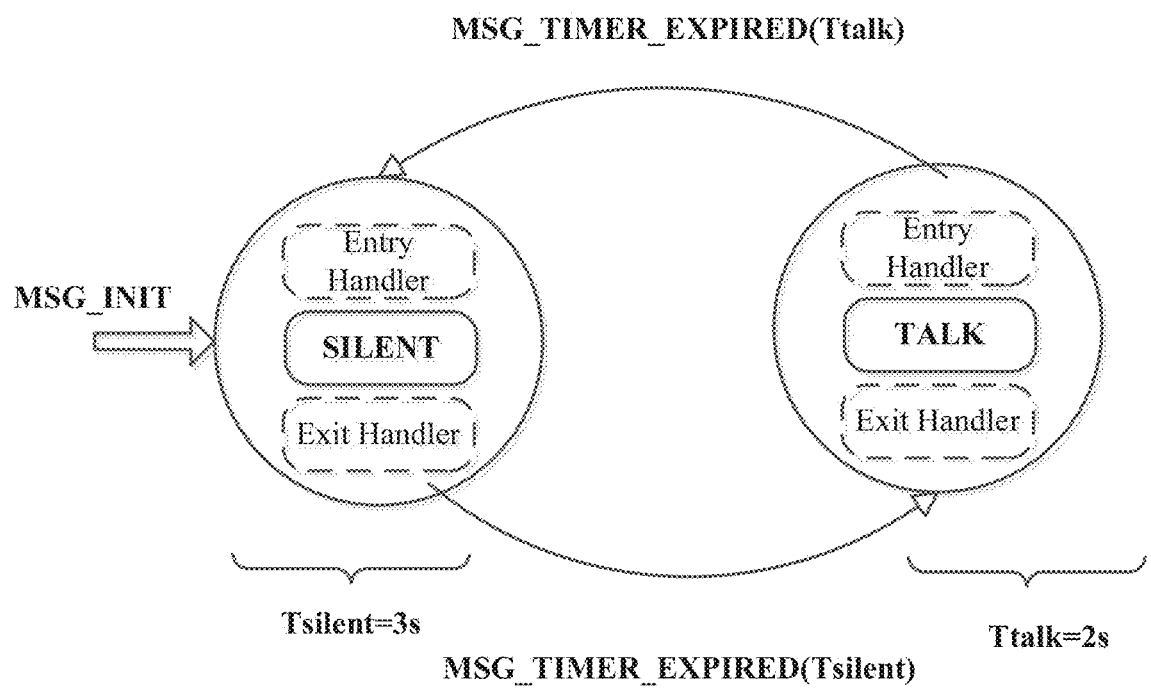
Fig. 24B – FSM for Voice Activity Model

```
//Default entry Handler for state SILENT
ON_STATE_ENTRY(VoiceCoder, SILENT)
{
        //Start a T_silent Timer for 3 seconds
        StartTimer(T_silent, 3*1000);

return false;
}
//Dedicated exit Handler for MSG_TIMER_EXPIRED while in state SILENT
ON_STATE_MESSAGE_EXIT(VoiceCoder, SILENT, MSG_TIMER_EXPIRED)
{
        //Check that the T_silent Timer has expired
        //and if so, then transition to the next state "TALK"
        if (IsTimerExpired(T_silent))
                NextState(TALK);

return false;
}
```

```
//Dedicated entry Handler for MSG_TIMER_EXPIRED while in state TALK
ON_STATE_MESSAGE_ENTRY(VoiceCoder, TALK, MSG_TIMER_EXPIRED)
{
        //Start a T_talk Timer for 2 seconds
        StartTimer(T_talk, 2*1000);

//Start Generating Voice Traffic
        GenerateVoiceTraffic();

return false;
}
//Dedicated exit Handler for MSG_TIMER_EXPIRED while in state TALK
ON_STATE_MESSAGE_EXIT(VoiceCoder, TALK, MSG_TIMER_EXPIRED)
{
        //Check that the T_talk Timer has expired
        //and if so, then transition to the next state "SILENT"
        //and stop the traffic generator
        if (IsTimerExpired(T_talk))
        {
                NextState(SILENT);

//Stop Generating Voice Traffic
                StopVoiceTraffic();
        }
        return false;
}
```

Fig. 25 – C++ Code for Voice Activity Model

FINITE STATE MACHINE METHOD FOR TEST CASE GENERATION AND EXECUTION OF COMMUNICATION PROTOCOLS

BACKGROUND

The technology disclosed relates to implementing a novel architecture of a finite state machine (abbreviated FSM) that can be used for testing. In particular, it can be used for testing communications devices and communication protocol behaviors.

Several approaches have been proposed to implement finite state machines. Some focus on minimizing memory consumption, combining or embedding finite state machine classes written in different programming languages, and exchanging inputs, triggers, or state values between finite state machines. Others implement look-up tables for actions to be performed in each state. Some of these architectures are optimized for hardware rather than software implementation.

Existing FSM architectures are cumbersome for test case modeling and generation, especially architectures that require a user to provide a large number of tables to represent states, inputs, triggers, actions, conditions, and events and that require the user to manage these tables. These architectures do not provide intrinsic support for test related operations.

An opportunity arises to provide users with a novel FSM architecture to create test cases or protocol behavior models. Fast and rapid deployment, configurability, maintenance, scalability, and ability to support multiple communicating finite state machines may result.

SUMMARY

The technology disclosed relates to implementation of a finite state machine. In some implementations, a novel architecture of a finite state machine can alleviate the complexity of modeling, generating, and executing industry-accepted testing for network communication protocol behaviors. Further details and alternative implementations appear in the accompanying figures, claims, and description.

BRIEF DESCRIPTION OF THE DRAWINGS

FIG. 1 illustrates a high level architecture of an example-testing environment in which the finite state machine architecture technology disclosed herein can be used.

FIG. 2 is a block diagram of an example threading architecture used in the example-testing environment.

FIG. 3 illustrates a high level architecture of the LTE-Uu interface comprising the radio resource control (abbreviated RRC) protocol with connection establishment procedure.

FIG. 4 illustrates a general framework of an example FSM.

FIG. 5 illustrates a state-message duple of an FSM.

FIG. 6 illustrates default and dedicated handlers of an FSM.

FIG. 7 illustrates a state with self-transition of an FSM.

FIG. 8 illustrates a state with default and dedicated handlers along with inter-state transitions and self-transitions.

FIG. 9A and FIG. 9B are high-level flow charts of an example FSM thread operation.

FIG. 10 is an example of an FSM with self-transition state.

FIG. 11 illustrates a parent FSM that instantiates two other child FSMs.

FIG. 12 illustrates a message sequence chart of the connection establishment procedure in RRC protocol with FSM annotations that.

FIG. 13 is a multi-state finite state machine used to implement test the message sequence chart behavior illustrated in FIG. 12.

FIG. 14 is a class diagram illustrating the inheritance of base class by the user class and division of code between classes.

FIG. 15 illustrates declaration of the handlers in a user class using MACROs.

FIG. 16 illustrates implementation of the handlers in a user class using MACROs.

FIG. 17 illustrates implementation of the GetFSMInfoTable(.) in an FSM user class.

FIG. 18 is the C++ header file of an example user class of the connection establishment procedure test case.

FIG. 19 is the C++ source file of the example user class of the connection establishment procedure test case.

FIG. 20 is an example of C++ code for the execution of the connection establishment procedure test case.

FIG. 21 is a high level flow chart of an implementation of a method.

FIG. 22 is a block diagram of an example computer system.

FIG. 23 shows the state representation of an FSM when a dedicated exit and entry handler is defined for the timer expiry message.

FIG. 24A and FIG. 24B show the FSM model used to describe the voice activity model in FIG. 23.

FIG. 25 shows the C++ code for the voice activity model showed in FIG. 23.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The primary example in this disclosure of applying a novel finite state machine to testing is drawn from 3GPP standard TS 36.523-1 pp. 283-285, which describes test criteria for conformance of new LTE systems certain sections of the LTE standard. 3rd Generation Partnership Project, "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 8)." 668 pp. Valbonne, France (V8.1.0 Mar. 2009) accessible at www.3gpp.org (hereinafter 3GPP TS 36.523-1). Instead of using conventional test scripting in a procedural language to implement the specified test criteria, the technology disclosed provides a user modifiable FSM specification with reduced complexity, relative to FSMs designed for other special purposes.

The conformance test example in FIGS. 12-22 uses FSMs instead of scripts. The test criteria specification, 3GPP TS 36.523-1, section 8.1.2 pp. 283-285, describes criteria for testing establishment of a connection when the SUT initiates an outgoing call. There are hundreds of conformance tests in 3GPP TS 36.523-1, to which the novel FSM architecture could be applied. The example of testing connection establishment should not be taken as limiting or preferred. The conformance criteria in this test illustrate the technology disclosed without being overly complicated. This example test is not intended to illustrate all of the technologies disclosed. For instance, it does not illustrate asynchronous operation of parent and child FSMs.

The technology disclosed includes an FSM architecture that separates supporting modules (or methods or objects) of an optionally hidden group, which can be delivered as an executable module, from user-modifiable code that specifies states, messages, and transition handlers. Test-related functions are intrinsic to the supporting modules. This architecture is well suited to system testing, as test states and behaviors are readily modifiable and can be instrumented to observe behavior within communication protocols. Users also can devise test protocols from scratch, using the technology disclosed and the intrinsic test-related features.

FIG. 1 illustrates a high level architecture of an example-testing environment 100 in which the FSM technology disclosed can be used. The example testing environment 100 tests the protocols that are used to implement an emerging wireless technology known as "long term evolution" (abbreviated LTE), which is used for wireless voice, video and data communications. This is one of the technologies commonly referred to by cellular providers as 4G technology. The testing environment 100 illustrated includes a traffic generator 115, test controller 123, network emulator 125 and user equipment 127. These components each include memory for storage of data and software applications, at least one processor for accessing data and executing applications, and components that facilitate communication over wired and/or wireless networks. Other configurations of environment are possible having more or fewer components than depicted in FIG. 1, either dividing roles of equipment components into more boxes or consolidating roles of multiple components into fewer boxes. The processors can be general-purpose processor, a reduced instruction set circuits (RISC processors), field programmable gate arrays (FPGAs), dedicated logic or other computing circuits. Software or firmware that implements the finite state machines can run on appropriate hardware.

The testing environment 100 emulates an evolved packet system, in a central LTE system network. The technology disclosed also can be applied to testing other packet systems, such as WiMax and other 802.11x networks, UTMS and CDMA networks and variations on these. The packet system illustrated transfers data packets between edge networks and user devices over a radio access network. The novel FSM architecture disclosed can be applied to other environments as well.

The traffic generator 115 generates traffic carried by an internet protocol-based (abbreviated IP-based) evolved packet core network that handles, for example, voice call management, data call management, and billing.

The test controller 123 is a computer-based system used to control, configure, debug, and trace test stimuli and responses. In one implementation, it uses a Windows XP or Windows 7 or 8 operating system (abbreviated OS). In other implementations, it uses a Linux, OS X or UNIX OS. It may be constructed as a real machine with dedicated hardware or as a virtual machine over a hypervisor. The test controller can be built on a personal computer (abbreviated PC), workstation, tablet, blade server, computing cluster or other computing device.

In one implementation, the network emulator 125 emulates a so-called evolved universal terrestrial radio access network (abbreviated E-UTRAN), which comprises a so-called evolved node B (abbreviated eNodeB), consistent with LTE specifications. The eNodeB provides bridging between user equipment 127 and the traffic generator 115. The eNodeB is also a termination point for all the radio protocols towards the user equipment 127 and acts as data relay between the radio connection and the corresponding IP based connectivity towards the traffic generator 115.

The user equipment 127 is a system under test (abbreviated SUT), otherwise known as a device under test (abbreviated DUT). In the example illustrated, the SUT is a mobile phone. The same approach can be applied to test or emulate other parts of a network that interact with the SUT.

In another example, the SUT could include a base station or a router. Those examples could substitute a different test harness for the network emulator 125. For instance, Spirent's Test Center™ hardware could be used to test an Internet core router.

FIG. 2 is an example of threading architecture 200 that can be used in the example-testing environment 100. The threading architecture 200 comprises multiple layers and procedures with their own threads modeled and implemented as finite state machines. Numbering of high level blocks in FIG. 2 matches numbering used in FIG. 1.

FIG. 2 shows a traffic generator 115 which, in some implementations, includes the components depicted and described herein.

A serving gateway (abbreviated S-GW) 215 is the local mobility anchor for the data holders and responsible for terminating the traffic generator 115 interface towards the network emulator 125. It also retains the information about the data holders when the user equipment 127 is in idle state 530.

A packet data network gateway (abbreviated PDN-GW) 217 provides the connection between the S-GW and external data networks like Internet. It acts as the highest-level mobility anchor in the testing environment 100 and assigns an IP address to the user equipment 127 to facilitate its communication with external networks.

A mobility management entity (abbreviated MME) 219 is responsible for managing security functions, mobility handling, roaming and handovers.

A test controller 123 that comprises a tracer 223. This component handles logging and tracing. Components of the testing environment 100 can use this component to log and trace different activities and states. A test console application can be implemented as console or GUI to retrieve logs and traces captured by this component.

The network emulator 125 in this example comprises a protocol stack of layers, including RRC, PDCP, RLC, MAC, and PHY layers. Some of these layers are common to a variety of cellular, mobile and LAN networks.

The RRC layer 225 implements a signaling protocol used to configure and control radio resources between the network emulator 125 and user equipment 127. This layer is responsible for broadcasting system information, paging, and reporting of user equipment 127 along with control, management, establishment, modification, and release of connection. The RRC signaling message is carried by a signaling radio bearer (abbreviated SRB).

The user equipment 127 has three RRC states including the idle state 1330, connecting state 1335 and connected state 1339. In the idle state 1330, no SRB is registered and RRC connection is not established. While in this state, the user equipment 127 detects the incoming messages and acquires system information. The connecting state 1335 is an intermediate state in which the timer 450 is initiated. In connected state 539, an SRB is registered and RRC connection is established. While in this state, the user equipment 127 establishes a radio resource context with the network emulator 125.

The packet data convergence protocol layer (abbreviated PDCP) 235 manages RRC layer 225 messages in the control plane and IP packets in the user plane along with data streams in the interface between the network emulator 125 and user equipment 127.

The radio link control layer (abbreviated RLC) 245 receives/delivers data packets from/to its peer entities.

The medium access control layer (abbreviated MAC) 255 provides coupling between the RLC layer 245 and physical layer (abbreviated PHY) 265 and also comprises a scheduler, which distributes the available bandwidth to the user equipment 127.

The PHY layer 265 provides data transport services on physical channels to the RLC 245 and MAC 255.

FIG. 3 illustrates a high level architecture of the LTE-Uu interface comprising the RRC protocol and its procedure. The RRC layer 225 can include several components, such as those described below.

A connection establishment procedure 315 establishes an SRB for transmitting a message to the traffic generator 115. The user equipment 127 on request for connection initiates the procedure during the idle state 1330. Primarily, this procedure is used to make the transition from the idle state 1330 to connected state 1339. The user equipment 127 makes the transition to connected state 1339 before transferring any application data or completing any signaling procedures.

A connection reconfiguration procedure 325 establishes, modifies, and releases an SRB on being initiated by the network.

A connection re-establishment procedure 328 re-establishes the connection by resumption and reactivation of an SRB used for transmitting a message to the traffic generator 115.

FIG. 4 illustrates one general framework of an FSM 400 as disclosed in this application. The FSM 400 has a number of states and behaviors that are modeled by exit, entry or/and timer handlers. In addition to the states, an FSM has a number of transitions that lets the FSM switch from a current state to a different state based on the input message. An FSM can use several components for message processing including a message queue 415 and dispatcher 410. The message queue enqueues incoming messages in a first in, first out (abbreviated FIFO) order. The dispatcher 410 dequeues the messages from the message queue in a FIFO manner to the current state and invokes the respective handlers for each state. If the entry, exit, and/or timer handlers are invoked and completed, the dispatcher checks the return Boolean value of these handlers. If the value is "False", this means that the FSM is still running and the dispatcher continues to dequeue and dispatch messages. However, if the return value is "True", the dispatcher stops dispatching any queued messages, and the FSM is considered to be complete.

In the FSM 400, the MSG_INIT 420 is received by the initial state S0 that comprises of an exit handler and entry handler. The state S1 is an intermediate state, also comprising an exit handler and entry handler. The state Sn represents any other states that the FSM 400 may have along with its exit handler and entry handler. If the message is a timer expiry message, the default timer handler 450 is invoked.

FSM Transitions

FIG. 5-8 and FIG. 10-11 are state diagrams that illustrate many configurations of the FSM technology disclosed. Among the diagrams, various combinations of messages, transitions and exit/entry handlers are illustrated.

FIG. 5 is a representation of example state-message duple of an FSM 500. An FSM can include a special state called the initial state 515, which the FSM enters upon initialization or start-up. When the FSM is initialized, a message called MSG_INIT 510 is enqueued into a message queue 415 and sent to the FSM 500. Upon receipt of this message, the system calls exit handler of the initial state, which contains the instructions for exiting the initial state.

FIG. 6 illustrates example dedicated handlers of an FSM 600. These state handlers are used to process an incoming message 610, received while in a state and when exiting or entering it. One or more exit handlers and entry handlers model the behaviors related to the states of a FSM. The so-called default exit handler 655 or default entry handler 625 are methods, function-calls or similar blocks of code that contain instructions to describe and implement the state behaviors. Invoking these handlers serves invokes the state behaviors. A state can also be modeled to handle specific messages by invoking either the so-called dedicated exit handler 645 or dedicated entry handler 635 or both. Messages X and Y cause a transition to enter the state; hence they only have a dedicated entry handler. Messages Z and W cause a transition to exit the state; hence they only have a dedicated exit handler.

FIG. 7 illustrates a self-transition within a state. This illustration includes multiple self-transitions responsive to various messages. Messages X, Y, Z, and W have their own pairs of dedicated exit and entry handlers. No default handlers are illustrated for this state.

FIG. 8 illustrates implementations of state handlers responsive to various transitions. Messages X and Y cause a self-transition. In this example, they have pairs of dedicated exit and entry handlers. Messages A and B cause a transition into the state S0, with dedicated entry handlers. Messages Z and W cause a transition that exits state S0; they have dedicated exit handlers. Message C causes a transition to enter the state; in this example, Message C does not have a dedicated handler. Thus, the default entry handler is invoked for this message. Message D causes a self-transition to the state, without dedicated handlers; thus, the default exit and default entry handlers are invoked for this message. Message E causes a transition to exit the state and does not have any dedicated handler, so the default exit handler is invoked. Thus, FIG. 8 provides examples of handler configurations for three transition types.

FIG. 23 shows the state representation of an FSM when a dedicated exit and entry handler is defined for the timer expiry message. The technology disclosed herein can be used to define a dedicated exit or entry handler for the initialization message MSG_INIT or for a timer expiry message MSG_TIMER_EXPIRED. The latter can be sent to the FSM when a timer expires. If a timer expires, the timer expiry message "MSG_TIMER_EXPIRED" can be generated and enqueued. This message can be later dispatched to the current state. If a state possesses a dedicated exit or entry handlers for this timer expiration message, those handlers can be invoked.

Applying FIG. 4 to FIG. 8, a default timer is set, which may generate for a timer expiry message (abbreviated MSG_TIMER_EXPIRED). The default timer handler 450 is invoked where the timer expiry message is received by a state. The timer handler implementation can include retrieving the name of the current state and checking the status of a guard timer.

FIGS. 9A and 9B are high-level flow charts 900A and 900B of an example FSM thread operation. Upon receiving a message 910, 912, the dedicated exit handler is invoked first 914, 916, and if the message does not have a dedicated exit handler 956, then the default exit handler is invoked 958. The exit handler specifies whether a state change takes place 918 to a next state or the same state remains. In either case, the dedicated entry handler of the next state is invoked 922, 924 and if the state does not have a dedicated entry handler 964, the default entry handler is invoked 966. If there is no dedicated or default entry handler, no entry handler is invoked 928. If the dequeued message is a timer expiry message 928, the default timer handler is invoked 930 as well. If any of the handlers return a "True" value 920, 926, 932, then the FSM thread is completed 934. States possess at least one handler, whether it is a default or dedicated handler and whether it is an exit or entry handler.

FIG. 10 is an example of an FSM 1000 with self-transition. In one implementation, the user can define a self-transition in the user class by defining an exit handler 1025 followed by an entry handler 1015 of the same state. If a state does not invoke a NextState(.) method that causes transition to a different state, then the message 1010 causes self-transition back to the same state S0.

A parent FSM can instantiate one or more child FSMs, FIG. 11. The parent FSM and child FSM communicate by exchanging messages but are different and run independently. A child FSM can be instantiated in the exit, entry, and/or timer handlers of the parent FSM. A parent FSM can send a message to its child FSM or can await completion of actions delegated to the child FSM. A child FSM, upon completion, sends a notification message MSG_FSM_COMPLETED to its parent. This notification message alerts the parent FSM to the completion of its child FSM. The MSG_FSM_COMPLETED is processed like any other message by default or dedicated exit/entry handlers.

A child FSM can inherit attributes and behaviors from a pre-existing parent FSM. FIG. 11 illustrates a parent FSM 1110 that instantiates two other child FSMs, namely FSM 1120 and FSM 1125, from a handler of S0 of the parent FSM. For instance, in the parent FSM1, when the exit handler of the initial state S0 is invoked, two other child FSMs, namely FSM2 and FSM3, are instantiated inside the exit handler. The exit handler returns after the child FSMs completed their operations.

A parent FSM can use several procedures or methods to communicate with the child FSM, including an isFSMCompleted(.) method. The isFSMCompleted(.) method is a polling method that checks the Boolean return value of the handlers. A "True" value of the Boolean return value indicates the completion of the child FSM.

In another efficient implementation, which does not use polling, a WaitOnFSMCompletion(.) method waits indefinitely until the child FSM thread is completed. In yet another implementation, an asynchronous non-polling notification message MSG_FSM_COMPLETED can be used to notify the parent FSM of the child FSM completion.

The base class of a child FSM can use routines or subroutines including a default constructor, another constructor, and a default destructor. The constructor of the base class of a child FM sets the current state to the initial state, following which a pointer to the parent FSM is stored.

Test cases implemented using FSMs test certain behaviors through messages, states, or transitions. If the test criteria for behaviors are not satisfied, the test case fails; otherwise it passes. The outcome of a test case, whether passed or failed, is commonly known as a "verdict". The verdict can be applied through methods defined in the FSM framework. These methods can set a verdict to "Pass" or "Fail" and also check it after FSM completion.

FIGS. 12 and 13 illustrate a message sequence chart 1200 with annotated state information and corresponding FSM diagram 1300 for an RRC connection establishment. FIG. 12 depicts a message sequence chart of RRC connection establishment procedure 315 at the network emulator 125, with state information added. FIG. 13 illustrates an FSM that models behaviors described by the message sequence chart in FIG. 12 and supports test instrumentation.

When the user equipment 127 is powered-on, it sends an RRC connection request message 1215 to network emulator 125. The network emulator 125 sends back an RRC connection setup message 1225 and starts a timer 1223. If the RRC connection setup complete message 1235 is received, the timer 1223 is stopped and user equipment 127 is successfully connected to the network emulator 125.

However, if the timer 1223 expires before the network emulator 125 receives the RRC connection setup complete message 1235, the user equipment 127 is not connected to the network emulator 125 and the test case fails.

The RRC connection request message 1215 includes the identity of the user equipment 127 and the cause of the connection establishment procedure 315. The network emulator 125 starts the timer 1223 to define the waiting period for the response of the user equipment 127 to the RRC connection setup message 1225. The procedure fails if the timer 1223 expires before the network emulator 125 receives the RRC connection setup complete message 1235 from the user equipment 127.

The RRC connection setup message contains the configuration information for an SRB used for transmitting a message to the traffic generator 115. The user equipment 127 sends an RRC connection setup complete message 1235 and completes the connection establishment procedure 315.

FSM Testing Example

FSMs with the disclosed user-modifiable entry and exit handlers can be used to conduct conformance testing according to criteria established in "RRC Connection Establishment: Success," TS 36.523-1, section 8.1.2.1, pp. 283-285. Satisfying these criteria is part of the battery of conformance tests applied to test conformance of new LTE systems tests. FSMs can be used to model and test hundreds of conformance testing criteria such as whether user equipment (an SUT) in RRC idle state is able to make an outgoing call and establish an RRC connection, whether an SUT in idle mode can initialize an outgoing call, whether an SUT can transmit an RRC connection request message, whether an SUT can respond to a system simulator (abbreviated SS) or a network emulator transmitting an RRC connection setup message, and whether an SUT is in a RRC connected state.

The test conformance with these criteria, a timer "T300" times these behaviors. Satisfaction of or failure to meet the criteria is reported by a verdict procedure. This timer is the guard timer in the "RRC Connection Establishment: Success" test case drawn from 3GPP standard TS 36.523-1, section 8.1.2.1, pp. 283-285. During conformance testing of new LTE systems, expiration of this guard time would result in a failed test case. The messaging in this sequence chart can be tested using the novel FSM technology disclosed herein. In general test in this standard and elsewhere can be represented in the state diagrams that can, in turn, be implemented using the novel FSM technology disclosed.

In FIG. 13, the incoming message, MSG_INIT 1320 of the test case is received by the initial state S0 comprising a novel dedicated exit handler. The state S1 is an intermediate state comprising two dedicated exit handlers, whereas the state S2 is the final state comprising only one default entry handler. After MSG_INIT 1320 is sent to state S0, state S0 waits until it receives a connection request message. When a connection request message is received, state S0 sends a connection setup message, starts a timer, and the current state changes to state S1. If a connection setup complete message is received while in state S1, the current state changes to state S2. Upon entering state S2, the FSM sets the verdict to "Pass" and stops the timer This test case is implemented using the FSM 1300, in which the initial intermediate, and final states are represented by the idle state 1330, connecting state 1335, and connected state 1339, respectively. The FSM 1300 comprises handlers such as dedicated exit handler 1323 and dedicated entry handler 1328 and messages like MSG_INT, MSG_TIMER_EXPIRED, RRC connection request message 1215, RRC connection setup message 1225, and RRC connection setup complete message 1235 for state initialization and transition. The FSM 1300 also includes a timer T300.

The dedicated exit handler 1323 or other handler handles the duple of idle state 1330 and RRC connection request message 1215. The connecting state 1335 has two dedicated exit handlers for RRC connection setup complete message 1235 and a MSG_TIMER_EXPIRED message. The connected state 1339 uses a default entry handler 1328.

When an RRC connection request message 1215 is received while the FSM is in idle state 1330, it sends back an RRC connection setup message 1225 to the user equipment 127. Then, the idle state 1330 transits to connecting state 1335 and starts the timer 1223. When RRC connection setup complete message 1235 is received, the connecting state 1335 transits to the connected state 1339. Upon entering the connected state 1339, the FSM 1300 sets the verdict to "Pass" and stops the timer 1223. The entry handler of the connected state 1339 returns a "True" value to signal the completion FSM 1300 and subsequent execution of connection establishment test case.

FIG. 14 is a class diagram 1400 illustrating the inheritance of a base class by a user class and division of code between them. The base class 1435 allows easy modeling, seamless implementation, and execution of test cases. It can be delivered as executable code that is not user modified. The user class can be delivered as user editable source code or can be authored by users.

The class diagram 1400 includes the base class 1435. In some implementations, it uses another class CState 1425 to create state objects. In other implementations, CState 1425 may be combined with base class 1435. The base class 1435 can have one or more instances of CState 1425 class where the base class represents the FSM and the CState class represents the FSM's states. Each class has its own attributes and methods. The class CState 1425 can have several FSM elements including states, state names, and default or dedicated exit, entry, and/or timer handlers.

The base class 1435 can have several procedures or functions including methods for starting the FSM 1300, sending the MSG_INIT 1320 to the message queue 1315, starting, restarting, or stopping the timer 1223. In addition, it can also possess methods for setting the verdict to either "Pass" or "Fail" or some other verdict value. In addition, to "Pass" or "Fail," the verdict can be accompanied by other parameters or information.

The connection establishment procedure test case 315 can be implemented as FSM 1300. The FSM 1300 can inherit from the base class 1435 a "GetFSMInfoTable(.)" method and a data structure "FSM_INFO_ENTRY. The user class 1445 can override the GetFSMInfoTable(.) method. This method when invoked by the base class 1435 retrieves the information of user class 1445 that can include state names, state handlers, and message alphabets. The GetFSMInfoTable(.) method returns a pointer to the array that contains information important for the implementation of FSM 1300. Entries in this array are represented by the data structure "FSM_INFO_ENTRY".

The base class 1435 can have several procedures or functions that facilitate the construction of the user class 1445 including use of MACROs that create several FSM elements including states, state handlers, timers, messages alphabets, and state transitions. In some implementations, the base classes delivered as executable code that is not user modifiable. Delivery of the base class as executable effectively conceals from the user the details of base class implementation and operation.

The user class 1445 can implement several test cases such as the connection establishment procedure test case 315. The user classes user modifiable to implement tests, such as the example test. In one implementation, the procedure has three states S0, S1, and S2 corresponding to the idle state 1330, connecting state 1335, and connected state 1339 in FSM 1300 respectively. In FSM 1300, default and dedicated exit and entry handlers may be defined for each state such as dedicated exit handler 1323 in state S0, dedicated exit handler 1324, dedicated exit handler 1325 in state S1, and default entry handler 1328 in state S2.

The base class 1435 performs several actions such as invoking the GetFSMInfoTable(.) method to retrieve all the user class 1445 information, receiving the MSG_INIT 1320 and enqueuing it in the message queue 1315 for further processing, invoking exit handler 1323 and entry handler 1328 of the current state, and invoking default timer handler 450 if the MSG_TIMER_EXPIRED is dispatched, and implementing methods for starting, restarting, and/or stopping the timer 1223 and setting or getting a verdict.

The user class 1445 performs several actions such as declaring message alphabets, idle state 1330, connecting state 1335, and connected state 1339. Additionally, the user class 1445 can declare and implement exit handler 1323 and entry handler 1328 for each state. Furthermore, the default timer handler 450 can also be declared for timer expiry messages.

The base class 1435 can possess several routines and subroutines including a default constructor and a default destructor. In the constructor, three messages alphabets MSG_INIT, MSG_TIMER_EXPIRED, and MSG_FSM_COMPLETED are added automatically to the message alphabets. The MSG_INIT allows the FSM 1300 to receive the initialization message, MSG_INIT 1320 when FSM is first instantiated or just after entering the idle state 1330. The MSG_TIMER_EXPIRED allows the FSM 1300 to receive a timer expiry message whenever the timer 1223 expires. MSG_FSM_COMPLETED is received by the parent FSM from a child FSM if the parent FSM instantiates a child FSM.

In the destructor, an FSM thread exit event is signaled and FSM is completed. The destructor waits until the thread is terminated before stopping, removing and flushing all other resources such as timer 1223 resources and message queue 1315 contents.

Since the FSM 1300 can be used for modeling a test case, the initial and default verdict for the test case is "Incomplete" until it is set otherwise by the user class 1445. The return values of exit handler 1323 and entry handler 1328 are set to be "False" by default indicating that the FSM 1300 is not completed.

The FSM 1300 can be started or invoked in a variety of ways, including calling a Run(.) method. This method starts by creating two events an exit event and a queue event. The first is used for signaling to exit the FSM thread while the latter is used for signaling that the message queue 1315 has awaiting messages. Inside the Run(.) method, the GetFSMInfoTable(.) method is invoked by the base class 1435. Depending on the number of states that exists in the user class 1445, one or more state objects can be created. Each state object can hold information such as state name and state handlers. All message alphabets retrieved from the user class 1445 are saved.

The MSG_INIT 1320 can be sent to the message queue 1315 by the base class. The base class further initializes the current state to the idle state 1330. The FSM thread is then created and started. The dispatcher dequeues the MSG_INIT 1320 and dispatches it to the current state.

In some implementations, the FSM 1300 can be stopped and re-run to start all over again by calling the Stop(.) method and Run(.) method respectively. In this implementation, the message queue 1315 is flushed and FSM 1300 starts from the idle state 1330.

The SendMessage(.) method can be used to send the MSG_INIT 1320. This method first checks whether a message is among the FSM message alphabets and if so, the message is enqueued for further processing. However, if the message is not among the FSM message alphabets, it is discarded. Whenever a message is queued in the message queue 1315, the queue event is signaled to indicate that there are messages waiting in the queue. Since the message queue 1315 is a shared resource between this method and the FSM thread, it is locked before it is used for enqueuing and finally unlocked after the method is finished using it.

The current state of the FSM can be changed to next state by using the NextState(.) method. The state change takes effect in the exit handler 1323 (whether default or dedicated handler). If a state change occurs in the entry handler 1328 or timer handler 450, can be considered void and not given effect. In yet another implementation, the current state of the FSM 1300 can be retrieved by using the GetCurrentState(.) method.

The Run(.) method creates a thread, which is used to start the FSM 1300. This thread has an infinite loop, inside which several events such as the message queue 1315 receiving a new message, indication of termination of FSM 1300, and receiving WM_TIMER message from the OS as a result of an expiry of the timer 1223 can occur.

If a new message is enqueued, then the thread dequeues this new message and forwards it to the exit handlers and entry handlers of the current state and the next state respectively. In addition, if the dequeued message is MSG_TIMER_EXPIRED, which indicates that the timer 1223 has expired, the default timer handler 450 is invoked as well. If the completion of an event requires termination of the FSM, the thread exits the infinite loop and terminates itself.

The timer 1223 can expire when a timeout value elapses. When this event occurs, OS sends a WM_TIMER message to the FSM thread, and the thread forwards this message to a callback static method called TimerExpired(.). In the latter method, the WM_TIMER message is replaced by MSG_TIMER_EXPIRED message and queued into the FSM message queue 1315 for further processing.

If the event is message queue event, the thread dequeues the Head-Of-Line (abbreviated HOL) message from the message queue 1315 and starts dispatching it to the exit handlers and entry handlers of the current and next state. If the dequeued message is a MSG_TIMER_EXPIRED, the default timer handler 450 is invoked as well.

The handler can return several variables including a Boolean return value, which signals whether the FSM 1300 is completed or not. If this Boolean value is "True", then this signals FSM 1300 completion and subsequent thread termination. When the FSM thread terminates, all FSM messages are removed from the message queue 1315.

The algorithm used for scheduling the invocation of default exit and entry handlers has an O (1) time complexity. The dedicated exit and entry handlers are stored in a balanced binary tree data structure and hence the algorithm used for scheduling their invocation has an O (log N) time complexity, where N is the number of specified dedicated handlers.

Intrinsic support in the base class for a verdict function is useful for test case modeling and execution. The base class 1435 allows this through several methods including SetVerdict(.) and GetVerdict(.). The verdict can be set to various values including "Pass", "Fail", or "Incomplete".

The base class 1435 also provides several procedures or methods to start, restart, and/or stop the timer 1223. These methods use underlying OS timer methods to identify the timer by its Id. To match the requirements of different protocol stack behaviors where timers are commonly identified using their names, the base class 1435 can use several unique identifications including "timer name" for modeling the timer 1123.

A StartTimer(.) method can be used by the base class 1435 to start the timer 1223. This method starts by stopping the timer 1223 if it is running and then calls the OS timer method to start a new timer. The OS timer method returns a timer Id. Once the timer is started, timer information such as timer name, timer Id, and timeout values are stored and saved.

A ReStartTimer(.) method can be used by the base class 1435 to restart the timer 1223 while it is active. It first retrieves the timer Id for the corresponding timer name, stops the timer and then finally starts it again.

A StopTimer(.) method can be used by the base class 1435 to stop the timer 1223 while it is active. It first retrieves the timer Id for the corresponding timer name and then stops it.

Upon receiving a timer expiry message, an FSM can use several procedures or methods such as calling a method called CallbackMethod(.) to initiate its timer expiry thread. This method is invoked by the OS and passes the timer Id as a parameter. Furthermore, this method first retrieves the timer name corresponding to the timer Id and then creates a new message called MSG_TIMER_EXPIRED containing the timer name. This new message is then sent to the message queue 1315 for further processing.

The user class 1445 can use several procedures or methods for declaring and implementing dedicated or default exit/entry handler, timer handler, or message alphabets. FIG. 15 illustrates declaration of handlers in a user class 1445 using MACROs. In one implementation, MACROs are used inside the definition of user class 1445 to define and declare the different handlers. The use of MACROs is to provide ease of use and less effort in writing the code for these handlers.

FIG. 16 illustrates implementation of handlers in a user class 1600 using MACROs. The MACROs are used to implement the handler header. The user can continue to implement the body of these handlers. In each handler, the user can write the exact behavior or instructions that are to be executed through code when this handler is invoked by the base class 1435.

FIG. 17 illustrates implementation of the overridden method, GetFSMInfoTable(.), in an FSM user class 1700. The user class 1445 can use several procedures or methods to register state-message duples and handlers including, implementing the GetFSMInfoTable(.) method using MACROs in the registration section 2120. Depending on the user design of the FSM and state handlers, the user can use one or more of these MACROs to declare states names, state handlers, and message alphabets.

The Connection Establishment procedure test case is implemented when user class 1445 is executed by instantiating an object of the user class 1445 using the default constructor. Following the instantiation, the Run(.) method is called.

Then the program waits until the FSM is completed and checks whether the verdict is "Pass" or "Fail". Finally, object of the user class 1445 is destructed. An FSM can be stopped after it has started running by calling the Stop(.) method. If a running FSM is stopped, its verdict is set to "Incomplete".

FIG. 18 is the C++ header file of an example user class of the connection establishment procedure test case. FIG. 19 is the C++ source file of the example user class of the connection establishment procedure test case. FIG. 20 is the C++ code 2000 for the execution of the Connection Establishment procedure test case. This C++ code 2000 is the main application. Some modules or codes within the main application can handle instantiating the user class 1445 object, calling the Run(.) method to run the user class 1445 object, waiting until the FSM completes by calling the WaitOnFSMCompletion(.) method, checking whether the verdict is "Pass" or "Fail" by calling the GetVerdict(.) method, and destructing the user class 1445 object.

FIG. 24A and FIG. 24B show the FSM model used to describe the voice activity model in FIG. 23. It has the same number of states and its timer expiry events are set to the same steady-state equilibrium values of 3 seconds and 2 seconds to obtain a VAF of 40%. Voice, video, data coders or traffic generators or sinkers can be represented using a continuous-time finite state machine where the main characteristics of the traffic can be described by probabilistic transitions or the time elapsed while being in each state. The finite state machine can be flexibly and efficiently used to describe and model continuous-time finite state machine such as voice, video, data coders or traffic generators. A voice coder can be modeled using a two-state voice activity model as shown in FIG. 24A and FIG. 24B where a human voice speech coder can be characterized by a transition from "SILENT" to "TALK" states and vice-versa also called ON/OFF model. The transition between the two states is not triggered by messages but instead by a probability. As shown in FIG. 24A and FIG. 24B, the transitions between the two states "SILENT" and "TALK" can be in the form of the probabilities a, b, 1-a, and 1-b. For such a voice activity model, the voice activity factor (abbreviated VAF) can be defined to be the steady-state equilibrium of the voice model being in the "TALK" state. VAF is the percentage of time where the voice model is in "TALK" state. Given the probabilistic transitions a and b, the steady-state equilibrium of the voice model can be mathematically computed using the formula VAF of 2/(2+3) or 40% as shown in FIG. 24A and FIG. 24B. FIG. 25 shows the C++ code for the voice activity model showed in FIG. 23.

In other examples, the technology disclosed can also be used to implement other test cases based on the compliance criteria in 3GPP standard TS 36.523-1 and similar standards documents. For example, the novel FSM architecture can be used to implement a test case corresponding to section 6.1.1, p. 13 that tests the idle mode operations in a pure E-UTRAN environment public land mobile network (PLMN). When an SUT is switched on, it attempts to make contact with a PLMN. The SUT looks for a suitable cell of the chosen PLMN and chooses that cell to provide available services, and tunes to its control channel. The SUT registers its presence in the registration area by means of a location registration (abbreviated LR). If the SUT is unable to find a suitable cell to camp on, or the SIM is not inserted, or if it receives certain responses to an LR request (e.g., "illegal SUT"), it attempts to camp on a cell irrespective of the PLMN identity, and enters a "limited service" state in which it can only attempt to make emergency calls. The user equipment has several states in the PLMN selection process such as the trying registered PLMN state, the not on PLMN state, the trying PLMN state, and the no SIM state. Message-sate duples and entry/exit handlers can be used to implement behaviors of the states or to test or record system conditions in various states.

The states and transitions of this test can be implemented using the FSM technology disclosed herein. The behaviors of these states can be modeled using FSM state handlers. The communication between the SUT and PLMN can be established through message alphabets, message queue, and dispatcher of the FSM. The FSM timer can time all the test case operations and the operation results can be reported using FSM verdict.

Other examples of test implementation using the FSM technology disclosed include: medium access control mapping between logical and transport channels by the SUT (3GPP standard TS 36.523-1, section 7.1.1, p. 50), random access channel (RACH) selection by the SUT drawn from 3GPP standard TS 36.523-1, section 7.1.2, p. 54, and downlink-shared channel (abbreviated DL-SCH) processing by the SUT drawn from 3GPP standard TS 36.523-1, section 7.1.3, p. 85. Some complex tests implementations can benefit from parent FSMs invoking child FSMs, as described next.

FIG. 21 is a high level flow chart 2100 of one implementation of the technology disclosed herein. Other implementations may perform the steps in different orders and/or with different or additional steps than the ones illustrated in FIG. 21. For convenience, this flowchart is described with reference to the system that carries out a method. The system is not necessarily part of the method.

At step 2105, the system initializes a test case application. Upon execution, the test case creates a user class object that inherits the public methods defined in the base class at step 2110.

Upon running the FSM, the system registers the message alphabets and state-message duple using the MACROs defined in the user class. This step 2120 is referred to as the registration section.

The handlers registered in the user class are invoked by the base class at step 2130 to implement the instructions outlined in the handler. In this implementation, the handler invoked by the base class is an exit handler and contains the instructions for next state transition.

The timer handler implementation includes retrieving the name of the current state. At step 2140, a timer method using a guard timer, times the state transition executed by the exit handler at step 2150 which represents state transition from state to another. Step 2160 constitutes a verdict method that is used to report results of the FSM operations. If the guard timer expires, it results in a verdict method declaring a "Fail" value at step 2160.

FIG. 22 is a block diagram of an example computer system, according to one implementation. Computer system 2210 typically includes at least one processor 2214 that communicates with a number of peripheral devices via bus subsystem 2212. These peripheral devices may include a storage subsystem 2224 including, for example, memory devices and a file storage subsystem, user interface input devices 2222, user interface output devices 2220, and a network interface subsystem 2216. The input and output devices allow user interaction with computer system 2210. Network interface subsystem 2216 provides an interface to outside networks, including an interface to network emulator 125, and is coupled via network emulator 125 to corresponding interface devices in other computer systems.

User interface input devices 2222 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2210 or onto network emulator 125.

User interface output devices 2220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 2210 to the user or to another machine or computer system.

Storage subsystem 2224 stores programming and data constructs that provide the functionality of some or all of the modules and methods described herein. These software modules are generally executed by processor 2214 alone or in combination with other processors.

Memory 2226 used in the storage subsystem can include a number of memories including a main random access memory (RAM) 2230 for storage of instructions and data during program execution and a read only memory (ROM) 2232 in which fixed instructions are stored. A file storage subsystem 2228 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 2228 in the storage subsystem 2224, or in other machines accessible by the processor.

Bus subsystem 2212 provides a mechanism for letting the various components and subsystems of computer system 2210 communicate with each other as intended. Although bus subsystem 2212 is shown schematically as a single bus, alternative implementations of the bus subsystem may use multiple busses.

Computer system 2210 can be of varying types including a workstation, server, computing cluster, blade server, server farm, or any other data processing system or computing device. Due to the ever-changing nature of computers and networks, the description of computer system 2210 depicted in FIG. 22 is intended only as one example. Many other configurations of computer system 2210 are possible having more or fewer components than the computer system depicted in FIG. 22.

Some Particular Implementations

In one implementation, a method is described that includes implementing a novel architecture of a finite state machine (abbreviated FSM) using code including a built-in base class and a user-modifiable user class. The method can include running the code on a processor. When running, the user-modifiable class inherits from the base class and registers a message alphabet and state-message duples. The method further includes defining exit and/or entry handlers for state-message duples including at least one exit handler that has a next-state specification connecting a first state that is exited in response to particular message in the message alphabet and a second state that is entered from the first state. The method can further include inheriting a test timer method used to set time limits on execution of operations during a test and a verdict method used to record test results.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method can include storing in computer readable memory as executable code the base class that is not user-modifiable and the user class as user-modifiable source code. It can further include the base class concealing operating details of the FSM, invoking the entry and exit handlers and the user class registering the state-message pair specifications.

The method can include the entry and exit handlers specifying behavior of the FSM. It can include the user class defining one or more default entry or exit handlers that apply to multiple state-message duples when dedicated handlers are not defined for particular state-message duples. It can further include the base class comprising a virtual method table that instantiates objects corresponding to the entry and exit handlers defined in the user class and being overridden by the user class to retrieve the user class information.

The method can further include the base class comprising the test timer method that instantiates objects corresponding to particular test timer methods invoked by the user class and a verdict method that instantiates objects corresponding to the verdict methods invoked by the user class. It can further include the verdict method recording a result specified in any of the entry and exit handlers and automatically recording the state of the FSM and a time at which the result is generated.

The method can include providing a user-modifiable test case that tests compliance with an industry standard for its enhancement. It can further include the test case implementing one or more actors that exercise the industry standard, interacting with one or more systems under test (abbreviated SUT) to be tested against the industry standard, and invoking the FSM after transmitting the communications channel parameters to the channel emulator by its program.

The method can include the test case program that invokes the FSM specifying communications channel parameters of a channel emulator that is coupled to the SUT, the base class transmitting the communications channel parameters to the channel emulator, and the entry or exit handler setting communications channel parameters of a channel emulator that is coupled to the SUT. It can further include executing the processor executable code in any programming language and the base class implementing a state tracker that keeps track of a current state of one or more FSMs during a test.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

We claim as follows:

1. A method of computer-implemented method of implementing an architecture of a finite state machine (abbreviated FSM) using code including a built-in base class and a user-modifiable user class, the method comprising:
   the user class, executing on a processor:
   inheriting from the base class;
   registering a message alphabet and state-message duples;
   defining exit or entry handlers for state-message duples, including at least one exit handler that has a next-state transition specification, and connecting:

a first state that is exited in response to particular message in the message alphabet and a second state that is entered from the first state;

inheriting a test timer method used to set time limits on execution of operations during a test; and inheriting a verdict method used to record test results.

2. The method of claim 1, further including defining the one or more exit handlers to a self-transition, in which the first state and the second state are the same.

3. The method of claim 1, wherein the base class is stored in computer readable memory as executable code that is not user-modifiable.

4. The method of claim 1, wherein the user class is stored in computer readable memory as user-modifiable source code.

5. The method of claim 1, wherein the base class conceals operating details of the FSM.

6. The method of claim 1, wherein the base class processes registrations of the state-message pair specifications by the user class.

7. The method of claim 1, further including the base class invoking the entry and exit handlers.

8. The method of claim 1, wherein the entry and exit handlers specify behavior of the FSM.

9. The method of claim 1, further including the user class further defining one or more default entry or exit handlers that apply to multiple state-message duples when dedicated handlers are not defined for particular state-message duples.

10. The method of claim 1, further including the base class comprising:

a virtual method table that instantiates objects corresponding to the entry and exit handlers defined in the user class, and, for methods overridden by the user class, retrieves the user class information.

11. The method of claim 1, further including the test timer method of the base class instantiating objects corresponding to particular test timer methods invoked by the user class.

12. The method of claim 1, further including the verdict method of the base class instantiating objects corresponding to particular verdict methods invoked by the user class.

13. The method of claim 12, wherein the verdict method records a result specified in any of the entry and exit handlers.

14. The method of claim 12, wherein the verdict method automatically records the state of the FSM and a time at which the result is generated.

15. The method of claim 1, further including implementing a user-modifiable test case at least in part using the FSM and the entry and exit handlers, wherein said test case tests compliance with an industry standard.

16. The method of claim 15, wherein the test case implements one or more actors that exercise the industry standard.

17. The method of claim 15, wherein the test case interacts with one or more systems under test (abbreviated SUT) to be tested against the industry standard.

18. The method of claim 1, further including a test case program invoking the FSM after transmitting the communications channel parameters to a channel emulator.

19. The method of claim 18, further including the test case program specifying to the FSM the communications channel parameters transmitted to the channel emulator that is coupled to the SUT.

20. The method of claim 15, wherein the base class transmits communications channel parameters to a channel emulator.

21. The method of claim 1, wherein the entry or exit handler sets communications channel parameters of a channel emulator that is coupled to the SUT.

22. The method of claim 18, wherein the test case program includes at least one FSM that instantiates at least one child FSM.

23. The method of claim 20, the base class implements a state tracker that keeps track of a current state of one or more FSMs during a test.

24. An article of manufacture that includes non-transitory computer readable storage medium storing instructions executable by a processor for testing a system under test (abbreviated SUT), comprising:

a finite state machine (abbreviated FSM) that includes a built-in base class and a user-modifiable user class;

wherein the user class:

inherits from the base class;

registers a message alphabet and state-message duples;

defines exit or entry handlers for the state-message duples, including at least one exit handler that has a next-state transition specification that connects:

a first state that is exited in response to a particular message in the message alphabet and a second state that is entered from the first state;

inherits a test timer method used to set time limits on execution of operations during a test; and inherits a verdict method used to record test results.

25. A system with an architecture of a finite state machine (abbreviated FSM), the system comprising:

a hardware processor;

code stored in memory coupled to the processor that includes a built-in base class and a user-modifiable user class;

the user class:

inherits from the base class;

registers a message alphabet and state-message duples;

defines exit or entry handlers for the state-message duples, including at least one exit handler that has a next-state transition specification that connects:

a first state that is exited in response to a particular message in the message alphabet and a second state that is entered from the first state;

inherits a test timer method used to set time limits on execution of operations during a test; and inherits a verdict method used to record test results.

* * * * *